(12) United States Patent
Grubish et al.

(10) Patent No.: US 6,721,483 B2
(45) Date of Patent: Apr. 13, 2004

(54) CABLE CLOSURE AND ASSEMBLY

(75) Inventors: Christopher S. Grubish, Solon, OH (US); Randy G. Cloud, Mentor, OH (US); Philip J. Pisczak, Chagrin Falls, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 222 days.

(21) Appl. No.: 09/981,187

(22) Filed: Oct. 16, 2001

(65) Prior Publication Data

US 2002/0064363 A1 May 30, 2002

Related U.S. Application Data

(60) Provisional application No. 60/241,203, filed on Oct. 17, 2000.

(51) Int. Cl.$^7$ ................. G02B 6/00; H02G 15/013
(52) U.S. Cl. ............. 385/135; 385/136; 385/137; 385/138; 385/139; 174/92; 174/93
(58) Field of Search .............. 385/53, 100, 139, 385/95, 134, 135, 136, 137, 138; 174/41, 77 R, 92, 93

(56) References Cited

U.S. PATENT DOCUMENTS

| | | | |
|---|---|---|---|
| 3,935,373 A | | 1/1976 | Smith et al. ............ 174/77 R |
| 4,173,913 A | | 11/1979 | Nicholson ............... 83/555 |
| 4,424,412 A | | 1/1984 | Goetter et al. ............ 174/92 |
| 4,433,732 A | * | 2/1984 | Licht et al. ............. 169/48 |
| 4,538,021 A | | 8/1985 | Williamson, Jr. ......... 174/92 |
| 4,549,040 A | | 10/1985 | Goetter ................. 174/92 |
| 4,581,824 A | | 4/1986 | Wilkins et al. ........... 30/310 |
| 4,721,830 A | | 1/1988 | Dagan et al. ............ 174/41 |
| 4,773,798 A | | 9/1988 | Gaster et al. ............ 408/102 |
| 4,822,954 A | * | 4/1989 | Rebers et al. ............ 174/93 |
| 4,839,471 A | | 6/1989 | Clark et al. ............. 174/92 |
| 4,857,672 A | * | 8/1989 | Rebers et al. ............ 174/93 |
| 5,322,973 A | | 6/1994 | Dagan .................. 174/41 |
| 5,360,945 A | * | 11/1994 | Truesdale et al. ......... 174/151 |
| 5,631,993 A | * | 5/1997 | Cloud et al. ............. 385/135 |
| 5,644,671 A | * | 7/1997 | Goetter et al. ........... 385/135 |
| 5,790,740 A | * | 8/1998 | Cloud et al. ............. 385/135 |
| 5,825,964 A | * | 10/1998 | Goetter et al. ........... 385/135 |
| 5,884,000 A | * | 3/1999 | Cloud et al. ............. 385/135 |
| 5,884,001 A | * | 3/1999 | Cloud et al. ............. 385/135 |
| 5,884,002 A | * | 3/1999 | Cloud et al. ............. 385/135 |
| 5,884,003 A | * | 3/1999 | Cloud et al. ............. 385/135 |
| 6,184,472 B1 | * | 2/2001 | Dams et al. ............. 174/93 |
| 6,215,939 B1 | * | 4/2001 | Cloud ................... 385/135 |
| 2002/0064363 A1 | * | 5/2002 | Grubish et al. ........... 385/135 |

FOREIGN PATENT DOCUMENTS

| | | | |
|---|---|---|---|
| EP | 0 320 236 A2 | 6/1989 | ......... 385/100 X |
| EP | 0 358 542 A1 | 3/1990 | ......... 385/100 X |
| EP | 0 538 008 A2 | 4/1993 | ......... 385/135 X |
| FR | 2 519 203 | 7/1983 | ......... 385/135 X |
| WO | WO 95/20773 | 8/1995 | ......... 385/135 X |
| WO | WO 96/33431 | 10/1996 | ......... 385/135 X |
| WO | WO 97/01119 | 1/1997 | ......... 385/135 X |
| WO | WO 97/12268 | 4/1997 | ......... 385/135 X |

OTHER PUBLICATIONS

WO 02/033796 A3—International Search Report; Jul. 30, 2002.

* cited by examiner

*Primary Examiner*—Brian Healy
(74) *Attorney, Agent, or Firm*—Fay, Sharpe, Fagan, Minnich & McKee, LLP

(57) ABSTRACT

A cable closure is provided which adapted to accommodate different size cables and different splices. The closure includes end plates designed to receive various size cables without requiring modification during field use. The end plates are interchangeable with stainless steel and injection molded closure shells. A sealant is provided which allows multiple re-entries into closure shell. Bolts are assembled on the exterior of the closure shell to eliminate potential misalignments between the bolts and closure shell holes. Washers are used within the end plates to seal holes not used for storing cables. A cutter is provided which cuts the washers in one 360° rotation thus eliminating weak points in the washer due to multiple cuts. Alternately a plug is provided for the end plate holes which are adaptable to several size holes to reduce the number of plugs required.

75 Claims, 25 Drawing Sheets

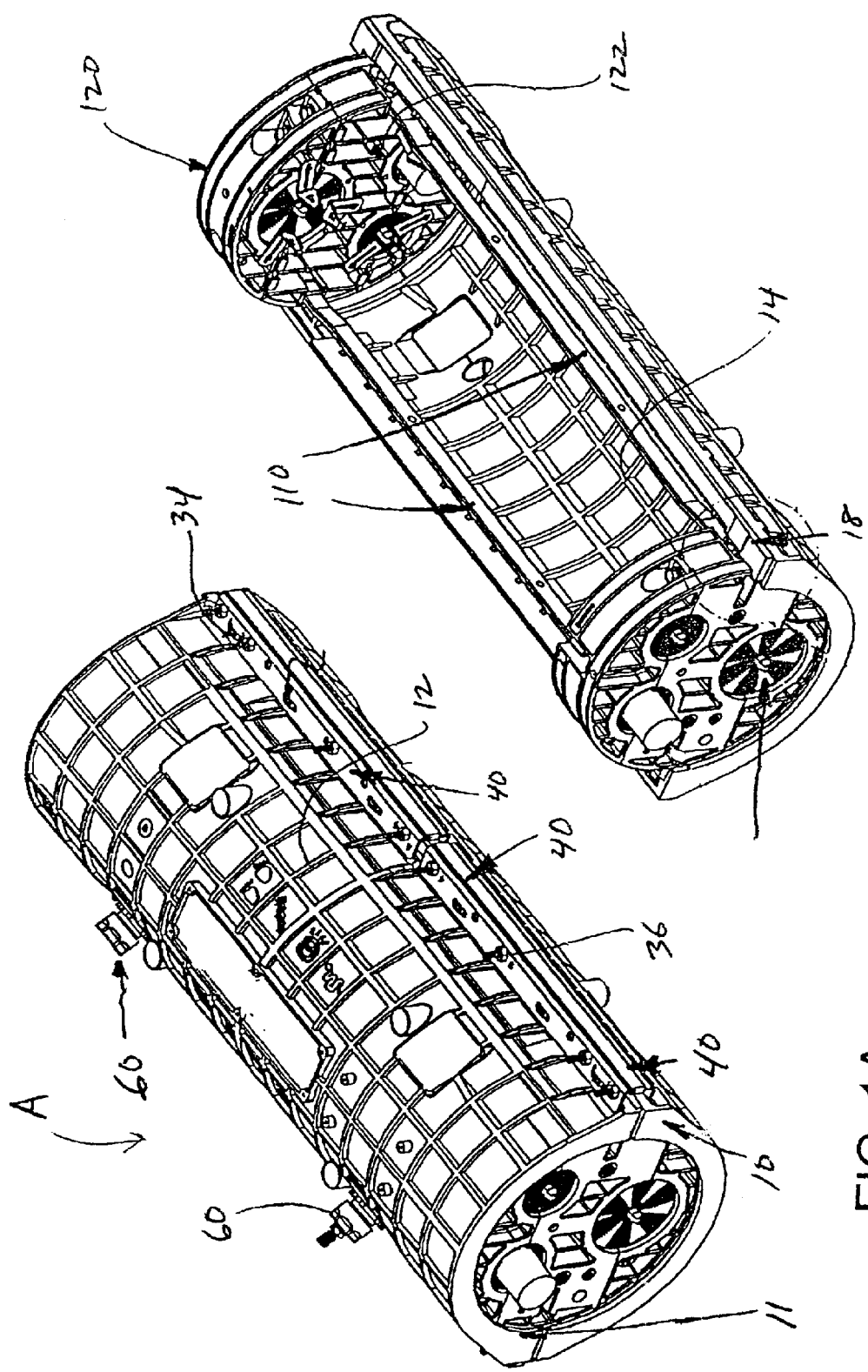

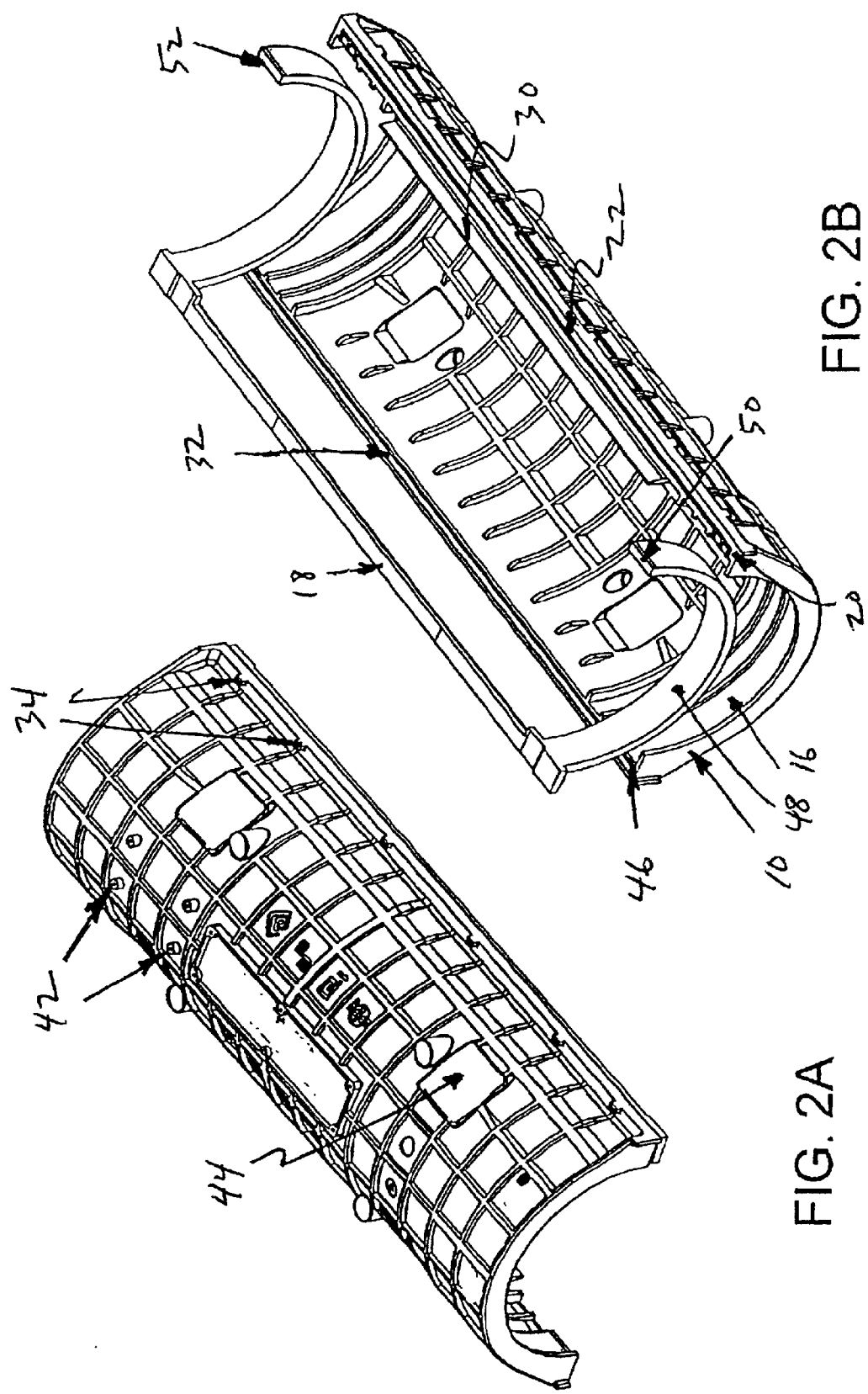

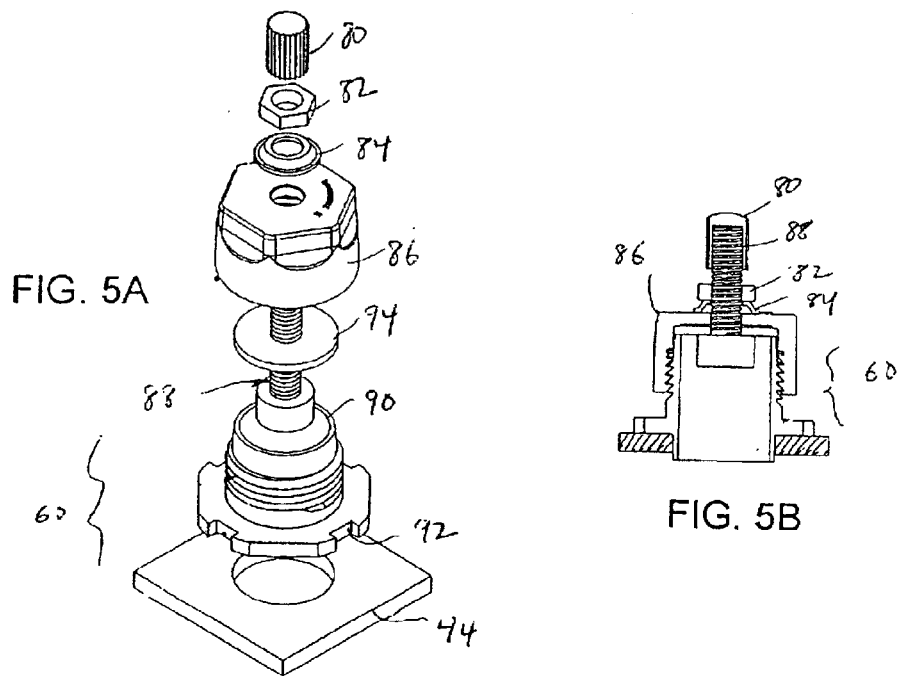
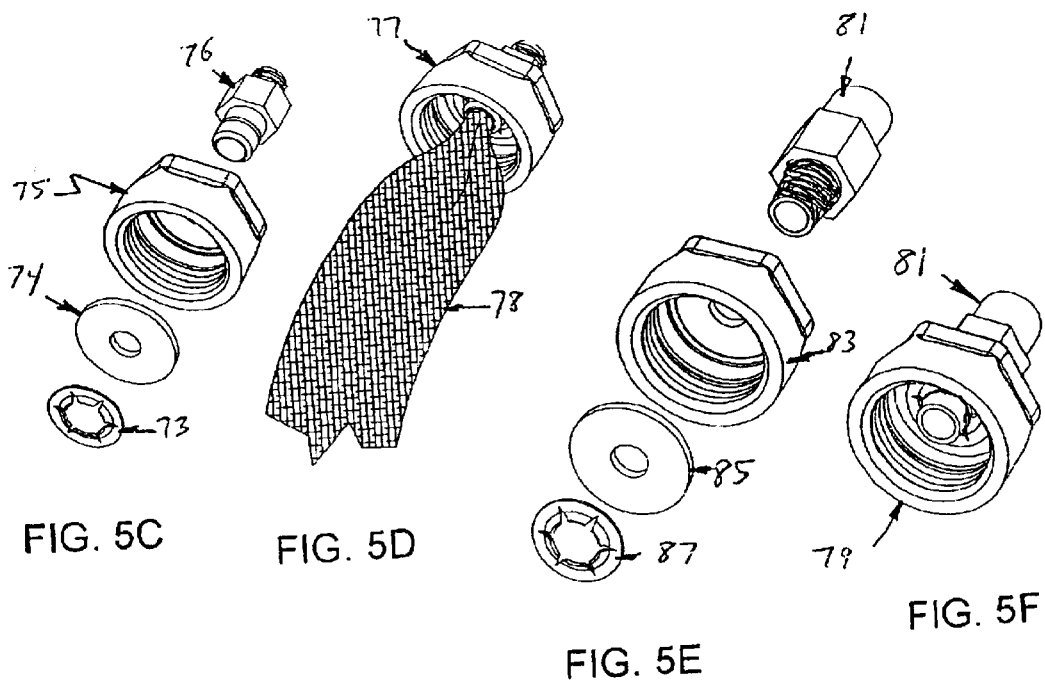
FIG. 5A
FIG. 5B
FIG. 5C
FIG. 5D
FIG. 5E
FIG. 5F

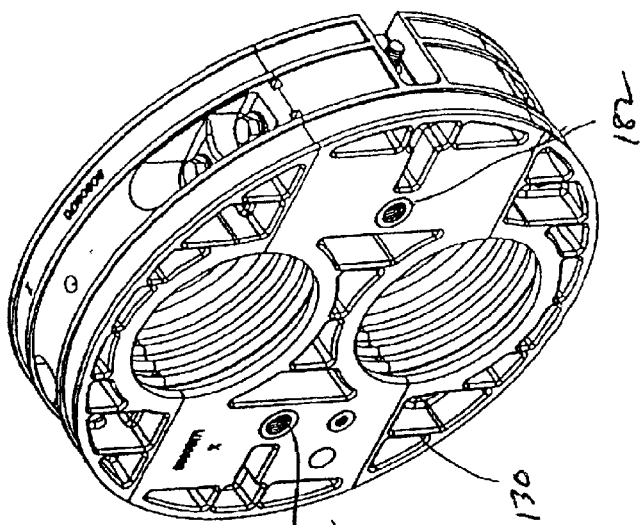
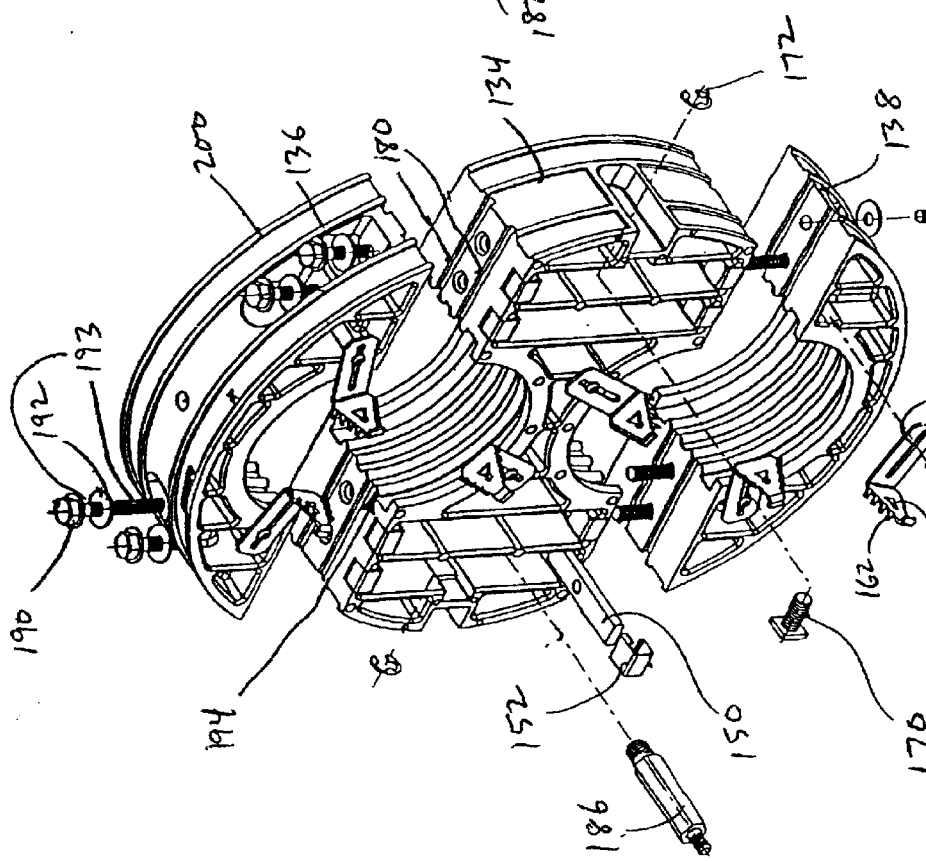
FIG. 12B
FIG. 12A

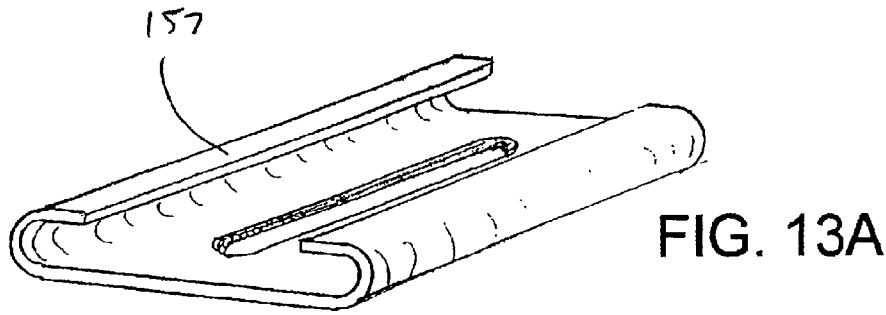
FIG. 13A
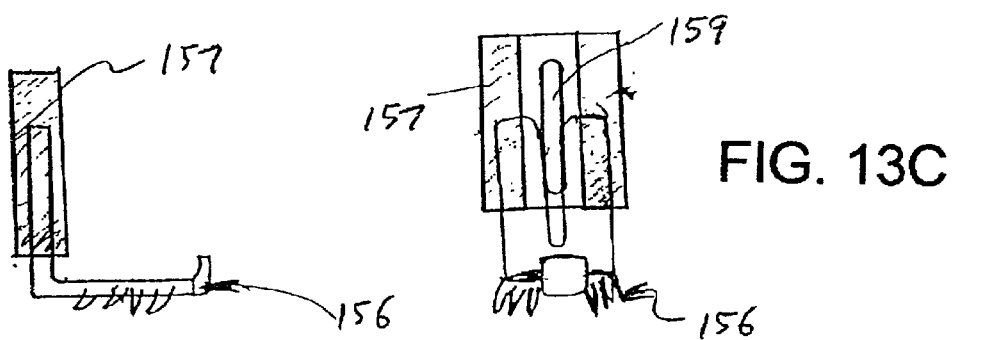
FIG. 13C
FIG. 13B
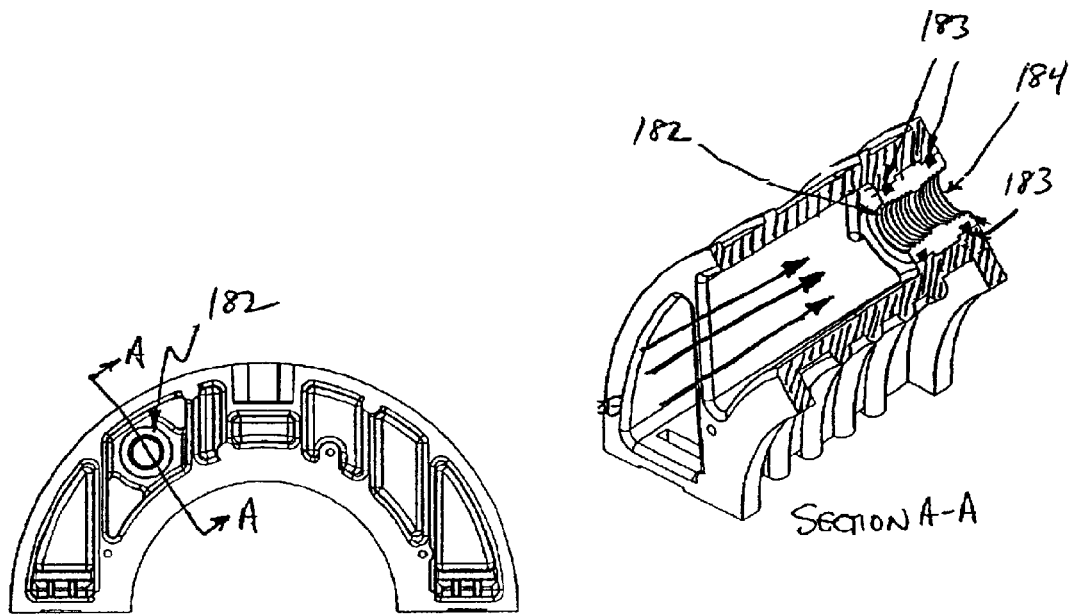
FIG. 14B
FIG. 14A

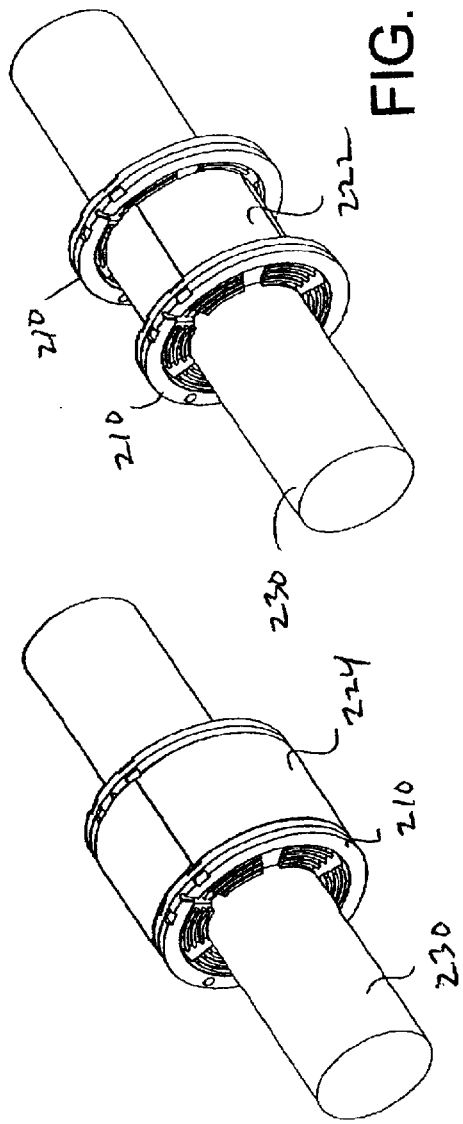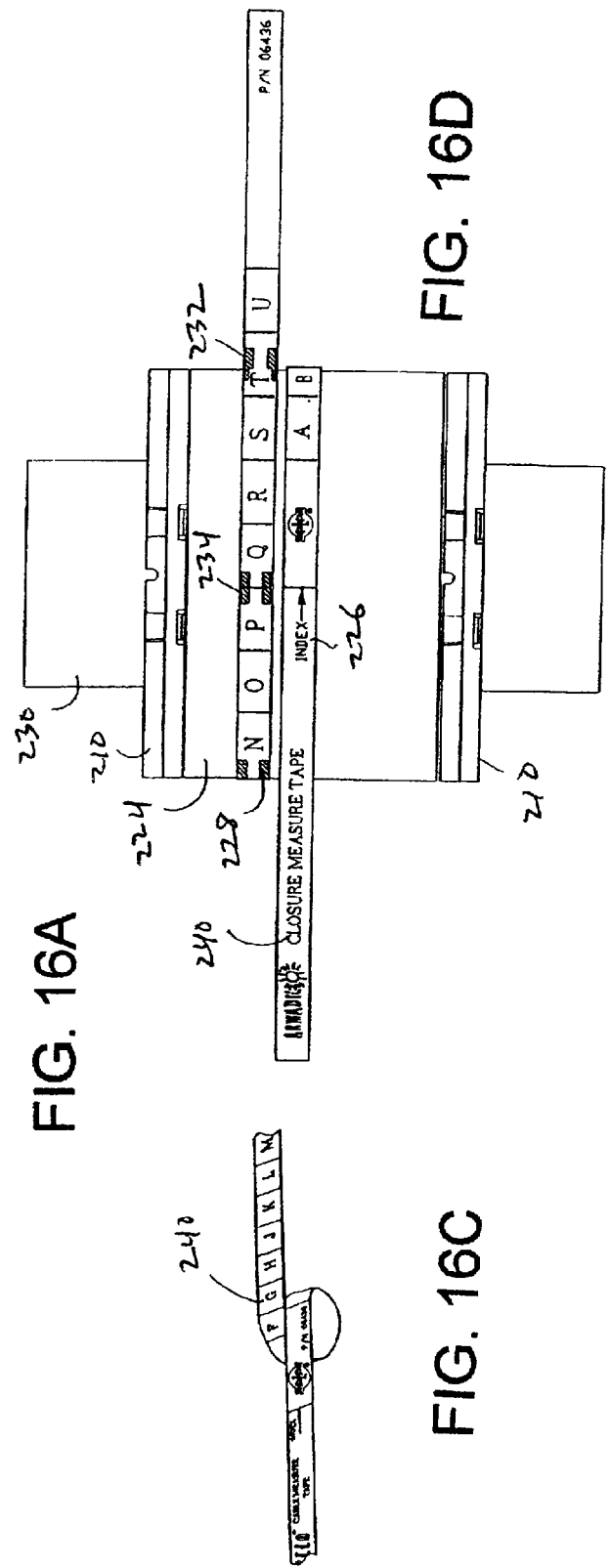
FIG. 16A
FIG. 16B
FIG. 16C
FIG. 16D

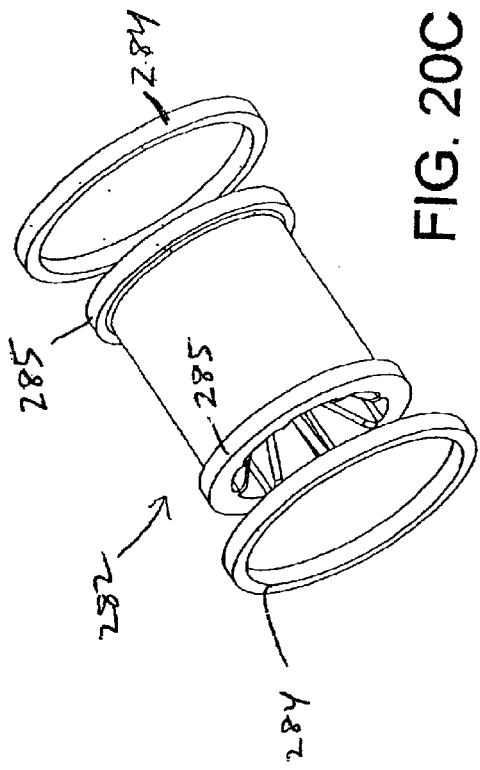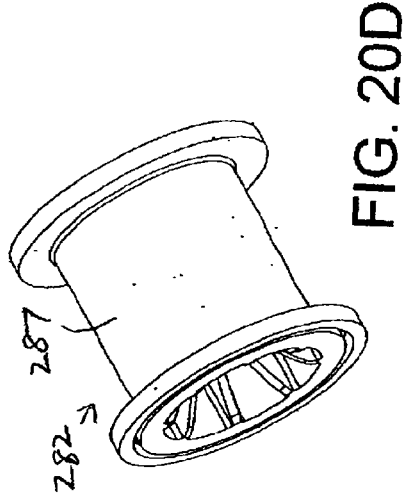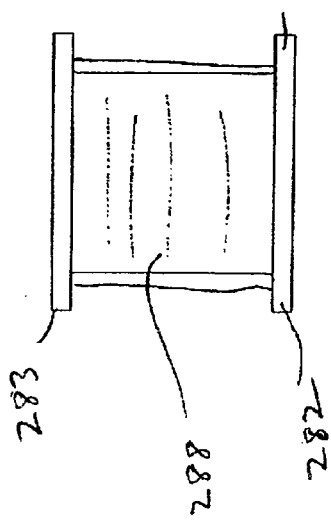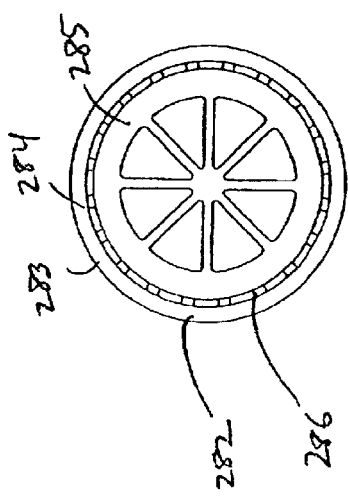

CABLE CLOSURE AND ASSEMBLY

CROSS-REFERENCE TO RELATED APPLICATION

This application claims priority from Provisional Application No. 60/241,203, dated Oct. 17, 2000.

BACKGROUND OF THE INVENTION

The present invention is directed to a cable splice enclosure assembly. Assemblies of the type under consideration are particularly suited for enclosing and housing copper splice cables, and the invention will be described with particular reference thereto; however, the apparatus could equally well be used with other types of cables, such as fiber optic cables.

Many different types of cable enclosures are known in the prior art. These prior enclosures are satisfactory to a greater or lesser degree but often have certain defects which make them inconvenient to use or prevent them from being readily adaptable to changing environments and conditions. It is, accordingly, a primary object of the present invention to provide a cable enclosure assembly that is easy to assemble and use and which can be modified or adapted for different size cables and can be formed in a variety of different sizes that allow the size and number of splices to vary. In addition, the present invention provides an enclosure that allows ready access for changing or adding to the number of splices in the enclosure. It is also an object of the present invention to provide end plates which are designed to receive various size cables without requiring drilling or modification during field use.

It is desirable to provide end plates which are interchangeable with stainless steel closure shells and injection molded closure shells.

In existing closures, the sealing system utilizes mastic sealants which need to be replaced upon each re-entry. Thus, it is desirable to provide a seal which eliminates the use of mastic sealant which has a tendency to "gum up" and have to be replaced.

Existing closure systems typically have bolts captivated within the actual closure shell. This approach makes assembly more cumbersome, as each bolt needs to be accurately aligned to the mating nut to avoid cross-threading. Thus, tolerance between the bolt holes needs to be tightly kept. Thus, it is desirable to provide a fastening system which eliminates the potential for slight misalignment between fasteners and holes for fasteners.

While working on existing closures in an aerial location, the craftsperson typically carries the closure shells down to ground level to remove them from the work area. Once work is completed on a splice point of cable, the craftsperson then returns to ground level to retrieve the closure shells to reassemble the unit. If the closure shells are carried down one at a time, the craftsperson would need to scale up and down a ladder several times thus creating inefficiencies during the work process. Accordingly, it is desirable to provide a means for securing closure shells in an aerial location while cable splices are worked on.

Existing end plate washers used with closures are thick solid disks with concentric annular grooves which require a special tool for cutting. One 360° rotation of a cutting device through a groove produces a properly sized hole through which the cable can pass. The washer must be cut a second time from the outer diameter to the inner diameter to create a split through which the cable can be passed to the inner diameter. This cut (seam) creates a weak point in the washer when it is assembled into their end plate. Thus, it is desirable to develop a cutter for washers which allows the washer to be cut with one rotation.

It is also desirable to provide a plug for end plate holes which are adaptable to several size holes to reduce the number of plugs required to fill the end plate holes.

Accordingly, it has been considered desirable to develop a new and improved cable closure and assembly and washer cutter which would overcome the foregoing difficulties and others while providing better and more advantageous overall results.

SUMMARY OF THE INVENTION

The present invention relates to a cable closure and assembly. More particularly, it relates to a cable closure system which is to provide a lower cost splice closure with performance similar to a stainless steel splice case.

The closure can function with an existing foam-filled end plate system. This approach allows substitution of lower cost shells for the stainless steel shells. The existing customer base is trained and equipped to drill the existing foam-filled end plate system and are less likely to expend money for training personnel to assemble the end plate. The design and assembly of the closure shells is very similar to the stainless shells and does not require extensive training.

The closure shell and gasket system of the present invention is designed to function with the sealing washer end plate system of the present invention, the current foam-filled end plate system or a combination of both.

To reduce the closure cost even further, a sealing washer end plate system is provided to allow assembly of an end plate without any special drilling fixtures as required with the existing foam filled end plate.

The sealing washer end plate system is designed as an alternative to the existing foam-filled end plate system. However, the end plate is compatible with existing stainless steel splice case shells as well as the closure shells of the present invention.

More particularly, the invention relates to the housing assembly for enclosing and storing the cable splices. The housing comprises first and second end plates axially aligned and spaced apart from one another. First and second housing members are releasably and sealingly clamped to each other and enclose the end plates. The end plates are located at opposite ends of the housing members. The housing members are symmetrical with respect to each other.

A sealing member extends along a length of the housing members and is located along the longitudinal edge of at least one of the housing members. Third and fourth housing members are interchangeable with the first and second housing members and are also clamped to each other and enclose the end plates and are symmetrical with respect to each other. First and second housing members each comprise gas-assisted injection molded shells. Third and fourth housing members each comprise stainless steel shells. A rigid bar member is joined to the first and second end plates to hold them in an axially aligned and spaced relationship.

The housing members each further include a plurality of rib elements extending from exterior surfaces to form a support for permitting the housing member to rest on a flat work surface. At least one of the housing members comprises an alignment rib extending along a longitudinal axis of the housing member. The housing members each comprise a main body portion with clamping flanges extending outwardly therefrom and in opposed relationship to each other. The clamping flanges have inner end portions adjacent to the main body portions and have free outer ends. The seal member is positioned between the flange inner ends and is positioned between the inner end portions along a longitudinal axis of the housing members.

End plate seal members are embedded into channels at opposing ends of the housing members. A gasket extends along the longitudinal axis of the housing member and is connected to the end plate seal members. The gasket is recessed within a groove along the longitudinal axis of the first housing member. The gasket is located on the first side of the housing member and the sealing element member is located on the second side of the housing member. The second housing member also comprises a seal member located on a first side and a gasket recessed in a groove on a second side. The gasket of the first housing member and the seal member on the second housing member are compressed together to form a seal. The seal member on the first housing and the gasket on the second housing member are also compressed together to form a seal. The gasket is preferably comprised of neoprene rubber.

First and second retention members are provided which comprise a plurality of slotted openings which align with tabs on the housings. The retention members clamp the first and second housing members together. The retention members comprise a pair of members each having a plurality of slotted openings and a plurality of fastening means to secure the pair of slotted members to each other. A spacer is compressed between the pair of slotted members to transfer a uniform load along the longitudinal axis of the housing members. Retaining members or outboard of the clamping flanges of the housing members.

A filling flange is attached to an outer surface along the housing members via spin welding. The filling flange comprises a cap and an air valve sealed by the cap. Alternately, the filling flange can comprise a cap and a check valve for injecting encapsulant into the housing. Alternately, the filling flange can comprise a cap and a grounding plug for accommodating a grounding wire.

The end plates may comprise one, two, or three holes for cable insertion. Each end plate further comprises a nut strip which distributes the load and draws the end plate sections together and fastens the end plate sections to each other. An air and grounding insert is molded into an opening within each of the end plates for connecting an associated air valve and grounding insert to the housing.

A method for measuring the outer diameter of a cable prior to insertion into a seal washer comprises inserting the cable through a pair of seal washers, applying a layer of tape around the outer diameter of the cable, applying a layer of sealant on the cable and tape until an outer diameter of the sealant is at least equivalent to an outer diameter of the seal washer, wrapping a measuring tape around the sealant and using index lines to check the quantity of tape needed prior to assembly.

An end seal washer for use with a cable closure comprises a first washer disk having a first side and second side where the first side has a plurality of ribs and the second side has a flat surface. A second washer comprises a disk with a first side and second side where the first side has a flat surface and the second side has a plurality of ribs. The first and second washers are symmetrical with respect to each other and are preferably formed of thermoplastic. Each washer further comprises holes and tabs spaced apart along a peripheral edge of where the holes in one washer engages the tabs of the mating washer. The tabs engage the holes to secure the first and second washer together.

A second side of the first washer and a first side of the second washer each further comprise a plurality of sections with grooves. Reference labels are provided adjacent each set of grooves for determining which grooves will be cut on each washer. Grooves of one of the washers may only engage a solid wall section of the other washer. A third washer and a fourth washer which are similar to the first and second washer are also assembled together and are connected by a spool to the first and second washers.

A portable washer cutter for cutting an internal cut-out from a flat washer comprises first and second enclosures which adapted to cooperatively engage together to cut a circular internal cut-out from the associated flat washer. The first enclosure has an internal cavity with a cutting member and the second enclosure has a supporting structure for the washer. The first and second enclosures are connected by an axle extending through the enclosures. The cutting member is radially adjustable between a first position and a second position on opposite sides of the first enclosure.

The first enclosure has a plurality of radial grooves extending from the central axis of the enclosure. The second enclosure has a plurality of ribs extending radially outward from the center axis of the second enclosure. The ribs vary in height from a first height greater than the second height. The ribs of the first height space the washer from a surface of the second enclosure and ribs of the second lower height engage spokes of the washer preventing rotation of the washer. The ribs are spaced apart in a radial direction to accommodate washers of varying diameters.

The second enclosure further comprises a plurality of extensions extending from a peripheral edge of the enclosure. Each of the extensions comprise a detachably secure positioning member. The extensions serve as hand grips during use of the cutter. A positioning member is secured to first and second sides of the second enclosure for securing the washer in place. The positioning members are detached from the extensions and are placed into openings in a second enclosure. Furthermore, one of the extensions has a hole for storing a positioning member after being detached from one of the extensions.

The second enclosure further comprises an alignment rib on a first surface and a second surface. An alignment groove is provided on the first enclosure which lines up with the alignment ribs of the second enclosure for positioning the cutting member.

A handle is provided on the first enclosure which is ergonomically shaped to approximate the shape of a user's hand. The cutting member comprises an elongated member having a slot therethrough and a blade positioned on one end of the member. The cutting member also has a threaded member extending through a hole in the first enclosure and through the slot of an elongated member. The blade is moved to a location indexed by an index margin on the first enclosure and secured into place by tightening the threaded member. The first enclosure is aligned with the second enclosure and is placed on as second enclosure is rotated 360° to cut the washer.

A plug is used for sealing the end plate opening which comprises a first ring and a second ring spaced apart from the first ring. A spool connects the first and second rings together. The first and second rings have a groove extending around the perimeter of the rings which allows the first ring to be separated from the second ring to reduce the diameter of the ring.

A hanging clip for suspending the cable closure shells during use comprises a body portion and a first and second member extending from the body portion, a third member which extends from the body providing a grip for the user's hand and a slot for receiving a tie wrap. The first member is a snap finger for engaging the exterior rib of an associated closure shell. The second member is locator rib which contacts an interior surface of the closure shell. The third member is a finger grip which is adjacent to the first member. The slot comprises a first and second slot generally perpendicular to each other. The clip is installed on a closure shell by applying a force to the hanging clip via the finger grip and separating the first and second members to engage the rib on the shell. The tie wrap is inserted through the slot and is tied onto a cable to suspend the closure shell from the cable.

One advantage of the closure system lies in the flexibility of cost and performance it provides. The closure can be configured in a multitude of ways to address a specific customer's needs.

There are several advantages of the sealing washer end plate system of the present invention versus the foam-filled end plate system: a) no special drilling fixtures are required; b) no electrical power source is required for the application; c) pliable mastic sealing tapes used with seal washers promote a more forgiving assembly than the foam-filled end plates; and d) higher grade engineered plastic resins are required for the foam-filled end plate system due to the heat generated during the foam filling process. Utilization of part geometry to increase stiffness and strength which allows for the use of lower grade resins in the end plate system reduces costs.

Another advantage is the provision of the end plates being interchangeable between the closure shells of the present invention and stainless steel closure shells.

Yet another advantage of the present invention is the provision of gaskets and seals which are embedded within the closure and allow assembly and disassembly multiple times of the closure.

Another advantage of the closure system is the provision of bolt bars which allow for slight misalignment during installation.

Still yet another advantage of the present invention is the provision of hanger clips which allow closure shells to hang from a cable during use.

Another advantage of the present invention is the provision of a washer cutter which cuts washers in one rotation.

Still yet another advantage of the present invention is the provision of an end plate hole plug which is adaptable to different diameter holes.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, one embodiment of which will be described in detail in this specification and illustrated in the accompanying drawings which form a part hereof and wherein:

FIG. 1A is a perspective view of the cable closure in accordance with one embodiment of the present invention.

FIG. 1B is a perspective view of half of the closure shell of the closure of FIG. 1;

FIG. 2A is a perspective view of one of the closure shells;

FIG. 2B is a perspective view of the mating closure shell for the shell of FIG. 2A;

FIG. 5A is an exploded view of the air/filling flange;

FIG. 5B is a cross-sectional view of the air/filling flange;

FIG. 5C is an exploded view of an air/filling flange with a grounding cap;

FIG. 5D is a perspective view of an air/filling flange with a grounding cap;

FIG. 5E is an exploded view of an air/filling flange with a check valve;

FIG. 5F is a perspective view of an air/filling flange with a check valve;

FIG. 12A is an exploded perspective view of a two-hole 9.5" end plate;

FIG. 12B is a perspective view of the two-hole 9.5" end plate;

FIG. 13A is a perspective view of a gripper bracket extender bracket;

FIG. 13B is a side elevational view of the gripper bracket of FIG. 13A;

FIG. 13C is a front plan view of the gripper bracket of FIG. 13A;

FIG. 14A is a side elevational view of an air/ground insert installed within an end plate;

FIG. 14B is a perspective cross-sectional view of the air/ground insert of FIG. 14A along section A—A;

FIG. 16A is a sealing washer perspective view showing prep tape wrapped around a cable extending therethrough;

FIG. 16B is a sealing washer assembly perspective view displaying the cable extending therethrough and the mastic sealant tape applied around the circumference;

FIG. 16C illustrates measure tape to measure compression of the end plate and mastic;

FIG. 16D illustrates the use of the measure tape on the end plate assembly;

FIG. 20A is a top plan view of the plug wheel with sealing tape wrapped thereon;

FIG. 20B is a front elevational view of the plug wheel;

FIG. 20C is a perspective view illustrating removable rings of the plug wheel;

FIG. 20D is a perspective view of the plug wheel;

DETAILED DESCRIPTION OF THE PREFERRED EMBODIMENTS

Figure 3B:
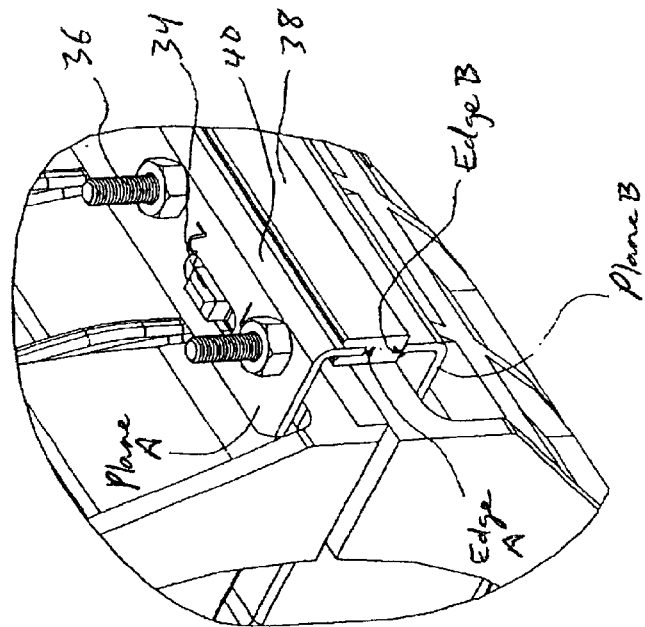
FIG. 3B is an enlarged view illustrating the bolt bar assembly.

Referring to the drawings, wherein the showings are for purposes of illustrating the preferred embodiments of the invention only, and not for purposes of limiting same, FIGS. 1A and 1B show a closure shell and gasket system A in accordance with a first embodiment of the present invention.

The closure shells 10, 11 of the present invention are preferably formed of injection molded components which utilize part symmetry to reduce part inventory. A closure assembly requires two of the same shells.

A rib structure 12, 14 is included on the exterior and interior of the shells 10, 11 to provide the strength and stiffness required for the closure to maintain an internal air pressure of 10 psi. The ribs are provided for structure and some form a support for permitting the closure to rest stably on a flat work surface.

Referring now to FIGS. 2A and 2B, the closure shell system includes an end plate gasket channel 16 in which a gasket 18 (which can be made of neoprene rubber) is located and bonded. The gasket is located on one side of the closure shell. End plate area sealing beads 20 are embedded into the gasket 18 on the flange of the opposing shell to create a seal. A flange sealing bead 22 extends the longitudinal length of the shell and embeds into the gasket on the flange of the opposing shell to create a seal.

The closure gasket 18 is preferably of unitary construction and formed of a compression molded neoprene rubber compound. The gasket 18 has an area which is bonded into the end plate gasket channel 16 at each end of the closure shell and has a T-shaped portion which is bonded into the gasket retention groove along the length of the shell.

When the two shells are brought together in their operative assembled positions, a reinforcement member or wall 30 extends beyond the flange of the opposing shell to add stiffness to the closure assembly as it is pressurized. Furthermore, the member serves to protect the cable bundles as the shells are mounted together.

The gasket is pressed and bonded into a gasket retention groove 32 to create a seal along the flange of the shell. In its preferred form, the shell design is symmetrical, but is constructed to be assembled in a single direction. This allows the flange sealing bead and end plate area sealing bead of one closure shell to be sequentially embedded into the gasket of the opposing shell along a predetermined direction thus creating a seal. One advantage of this seal is its re-enterability; that is, the shells can be disassembled and re-assembled as desired without causing permanent damage to the sealing system. Prior art mastic sealants must be replaced upon each re-entry. The shells are symmetrical where one side of the closure shell has the gasket and the opposite side has the flange sealing bead and vice versa for the other closure shell. An advantage of this seal is it eliminates the use of mastic sealant which has a tendency to "gum up" and have to be replaced.

Sealing beads or ribs 46 compress on the underside of the gasket to prevent air from escaping out of this region. The gasket has a seal area 48 on which an end plate rests and seals. An end sealing face 50, 52 is compressed against an opposing flange to create a seal. In FIG. 3A, the rectangular dashed line outlines the region or area where the end sealing face 50 is compressed to produce a seal. The sealing bead 22 is shown to create a seal against the gasket 18. Sealing rings 200 (FIG. 3A) from the end plate are forced outward to create a seal.

Figure 3A:
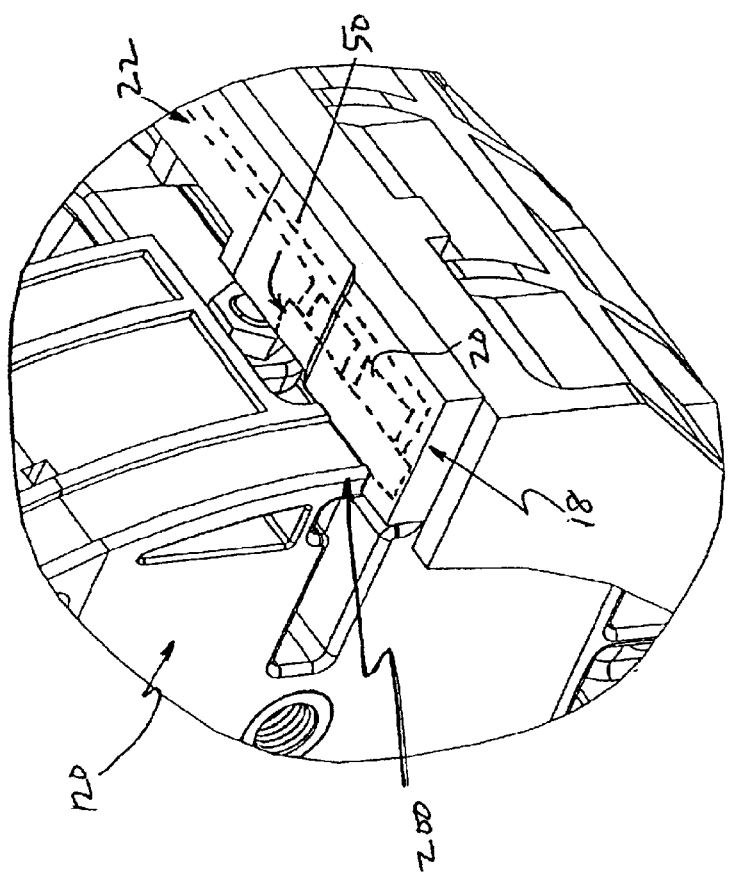
FIG. 3A is an enlarged view illustrating the seal in dashed lines.

Referring to FIG. 3B, upwardly extending bolt bar retention posts 34 are positioned in a spaced apart relationship along the length of the closure shell over which bolt bars 40 and bolts 36 are assembled. The posts 34 locate and restrict the bolt bars 40 from sliding along the length of the closure and from migrating outwardly upon pressurization of the closure.

Figure 6:
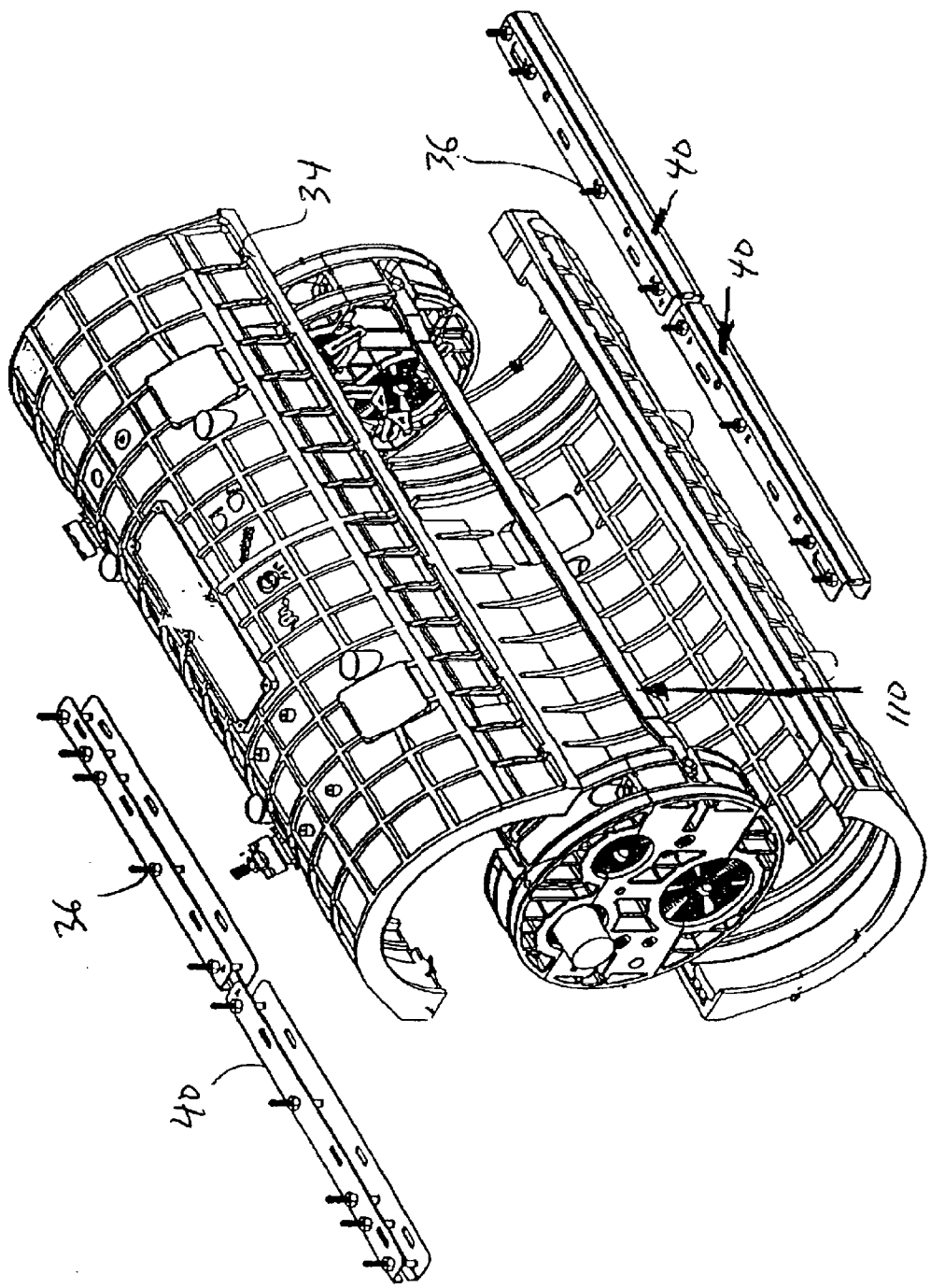
FIG. 6 is an exploded perspective view of the closure illustrating bolt and torque bars.

Referring now to FIG. 6, the bolt bar fastening system provides the clamping force required to draw the closure shells together, which forces the sealing features of the end plate and closure shells to seal against the gasket material. The bars 40 are supplied as an assembly. To assemble, the bars are spread apart enough to allow the bolt bar retention posts 34 to pass through the slot in the bolt bar. Referring to FIG. 3B, as the bars are tightened down, a spacer 38 is compressed between edge A and edge B of the bars and transfers the load forward against the shell flange. The primary purpose of the spacer 38 is to maintain parallelism between plane A and plane B of the retention posts to ensure a uniform compressive load is applied along the length of the flange. The stiffness of the metallic bars 40 helps distribute the load between the bolts 36. The bars 40 are symmetrical. Prior art systems have bolts captivated within the actual closure shell. This approach makes assembly more cumbersome, as each bolt needs to be accurately aligned to the mating nut to avoid cross-threading. Thus, tolerance between the bolt holes is essential. Since the bolts and bolt holes in the bolt bars are external to the closure shell, the bolt bars eliminate the potential for misalignment between the bolts and holes in the closure shell.

Referring to FIG. 2A, fastening bosses 42 are provided into which a self-tapping screw is installed to attach a customer identification plaque. A flat boss area 44 is also provided onto which the air/filling flange device is preferably spin welded.

Figure 4:
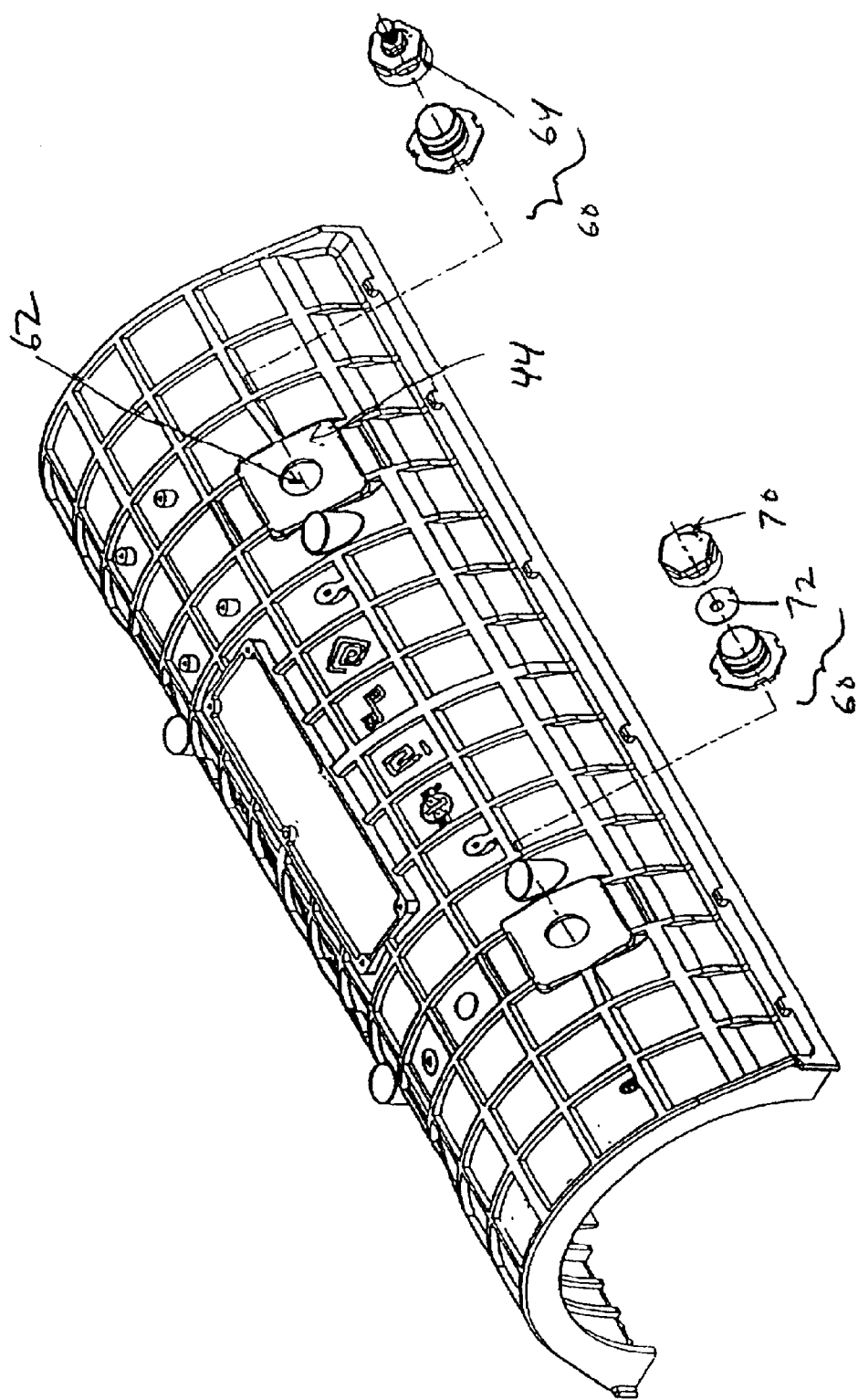
FIG. 4 is a perspective view of the closure shell half and air/filling flange.

Referring now to FIG. 4, a multi-purpose air/filling flange 60 provides a means for injecting air or pouring encapsulant into the closure. The air/filling flange 60 is attached to the closure shell preferably by using a spin welding process. Since the welding process creates a hermetic seal, a washer, nut and o-ring which are typically found in a similar assembly are eliminated.

A hole 62 is punched through the exterior of the closure shell on the flat boss region 44 for the flange. The hole also acts as a guide to help keep the flange concentric during the spin welding process. After the air/filling flange 60 is welded to the shell, different caps can be installed onto the flange for different applications. As an example, an air valve cap 64 is assembled onto the flange when closure pressurization is required. The air valve cap 64 is then used for injecting air into the closure.

Referring now to FIGS. 5A and 5B, the air/filling flange assembly comprises a cap 80, a nut 82, a washer 84, a cap 86 with a hole for an air valve, an air valve 88, the air filling flange 60 which has a top sealing surface 90 and drive slots 92. A washer 94 seals against the top of the air/filling flange 60 on surface 90.

When it is desired to fill the closure with encapsulant, the encapsulant is poured through the air/filling flange 60 and then is capped off with a blank cap 70 (see FIG. 4). A seal 72, such as a rubber gasket, is pinched between the seal surface of the flange.

When it is desired to provide a grounding wire out through the closure shells, a separate cap assembly 77 is threaded into place. Referring to FIGS. 5C and 5D, the air/filling flange cap 77 includes a hole and comprises a retaining cup/washer 73, a rubber washer 74, a cap 75 and a grounding plug 76. A grounding strap 78 extends from the grounding plug 76.

Referring now to FIGS. 5E and 5F, a separate cap assembly 79 is provided for use with a check valve 81 for injecting encapsulant into the closure. The cap assembly includes the check valve 81, a cap 83, a rubber washer 85 and a retaining cup/washer 87.

A novel shell hanger clip system for improved closure maintenance will be described with reference now to FIG. 7. In the past, to work on a splice point within the closure, the craftsperson needed to carry the closure shells down to ground level to remove them from the work area. After work is completed on a splice point of cable B, the craftsperson would then return to ground level to retrieve the closure shells to reassemble the unit. If the closure shelves are carried down one at a time, the craftsperson would need to scale up and down a ladder several times thus creating inefficiencies during the work process.

Figure 8:
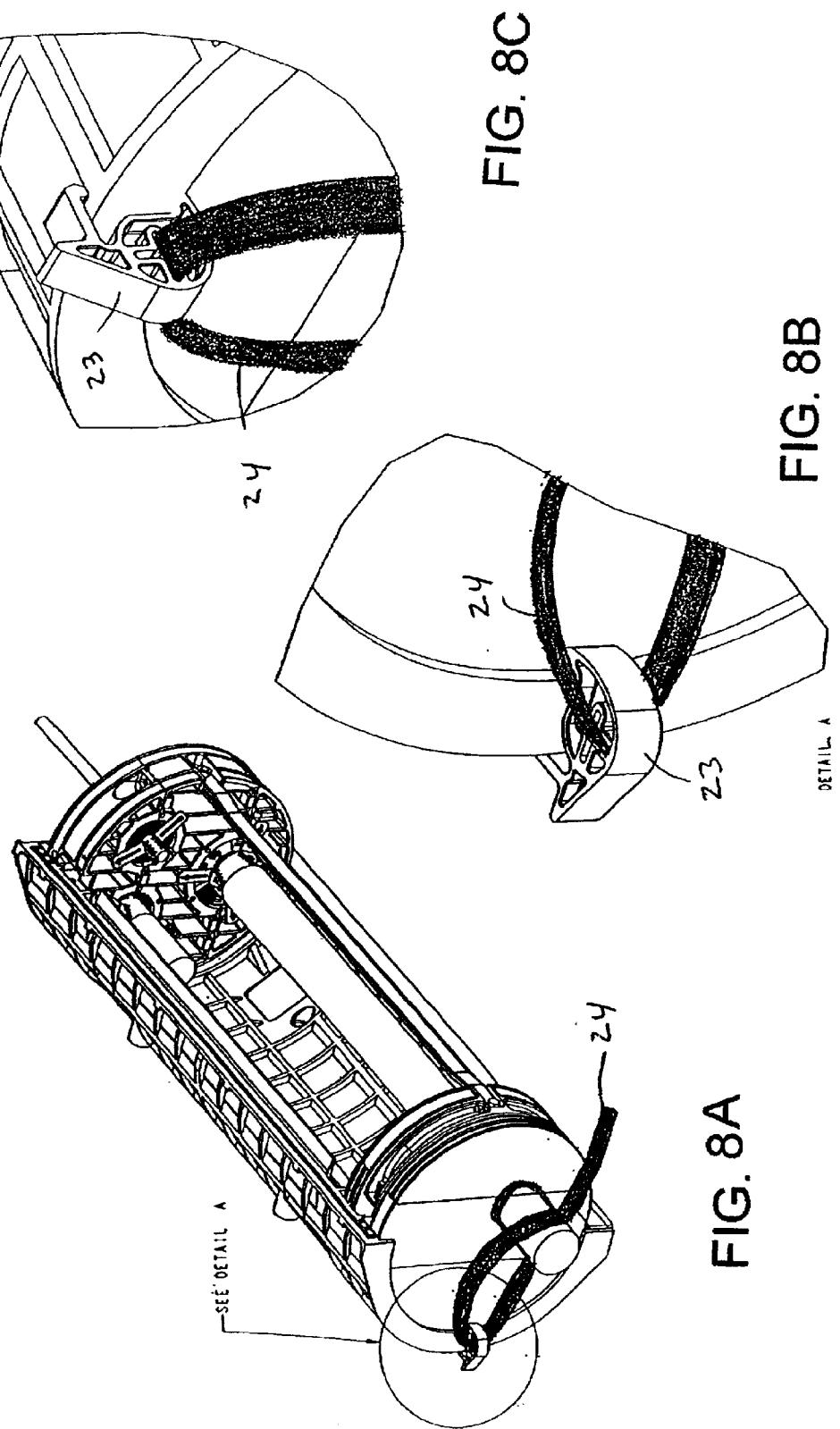
FIG. 8A is a perspective view illustrating hanger clips securing closure shell halves.
FIG. 8B is an enlarged perspective view of the hanger clip and tie wrap of FIG. 8A.
FIG. 8C is an enlarged perspective view of the hanger clip and tie wrap of FIG. 8A.

To avoid this, a pair of shell hanger clips 23 are provided as a means for attaching a tie wrap 24 to each closure shell thus allowing the shells to be hung near the splice point off of the cable. This eliminates the need for a craftsperson to scale up and down a ladder to deposit the closure shells thus saving time and increasing efficiency. The hanger clips 23 also provide a secondary benefit when a closure is being reassembled. The tie wrap 24 can be threaded through a hanger clip at each end of the closure shells and tightened around the cable entering the splice point. As the tie wraps are tightened, the closure shell is drawn up against the end plate system, as seen in FIG. 8A. FIGS. 8B and 8C illustrate the detail of the tie wrap extending through the hanger clip. The closure shells are then secure enough to free the hands of the craftsperson to continue work on the assembly. Once installed, the shell hanger clips do not obstruct the process of assembling or disassembling closures. The shell hanger clip may remain attached to the closure shell halves for use during a future re-entry.

Figure 9:
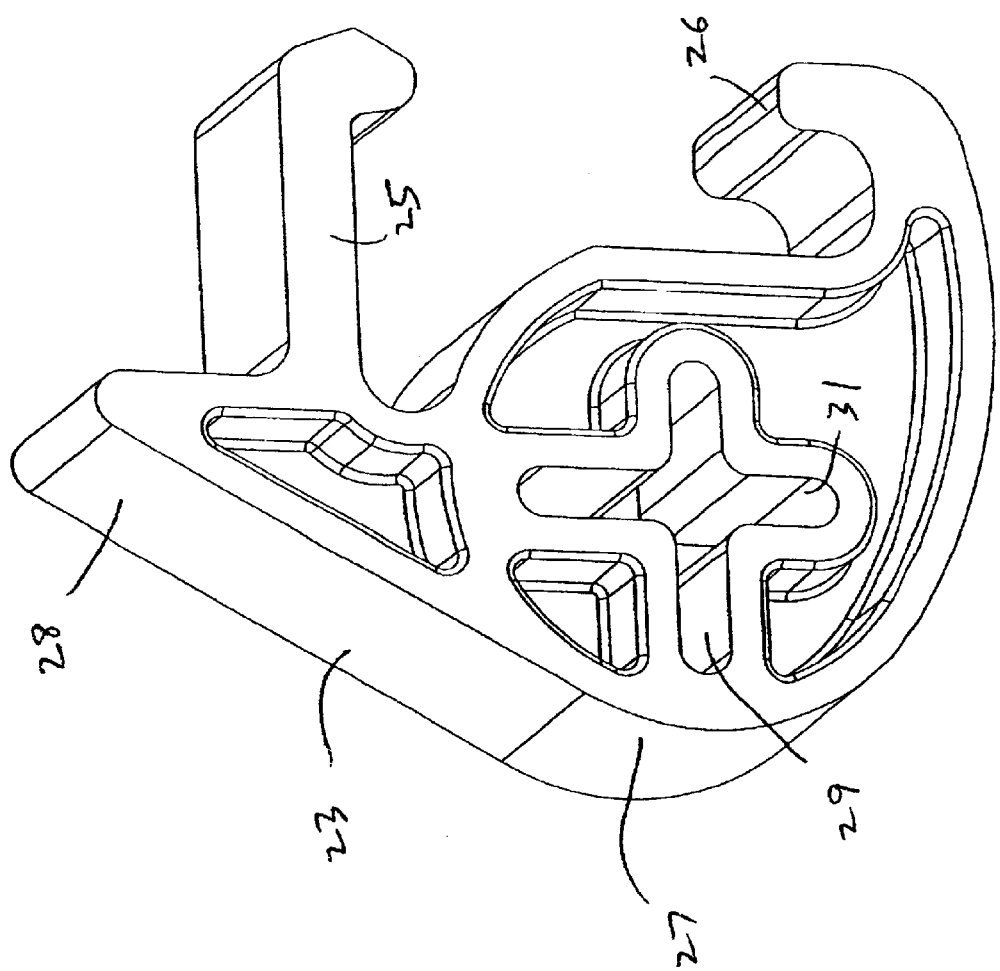
FIG. 9 is a perspective view of the hanger clip of FIG. 7.

FIG. 9 illustrates the detail of the preferred shell hanger clip 23. The shell hanger clip comprises a pair of arms or clips 25, 26 which extend from a main body portion 27 and are used to secure the clip onto an outer rim of the closure shells in a manner shown generally in FIG. 7. Arm 25 is a snap finger which engages over an exterior rib structure of the closure shell. Arm 26 is a locating rib which is spaced apart from the snap finger and is generally parallel thereto and contacts an interior surface of the closure shell half. Handle 28 forms a thumb grip which provides a point of leverage for removing the hanger clip from the closure shell. The handle portion 28 of the main body is extruded to provide a area to grasp the clip with fingers to detach the clip from the closure shell. The hanger clip is preferably made of a resilient plastic material which allows it to bend or deform slightly as the user grasps the handle and bends the clip slightly to release it from the end of the closure shell. Within the main body portion is a pair of slots 29, 31 which extend through the body and are generally normal to each other thus providing two openings for the tie wrap to extend through. The tie wrap may extend through either of the slots.

Figure 7:
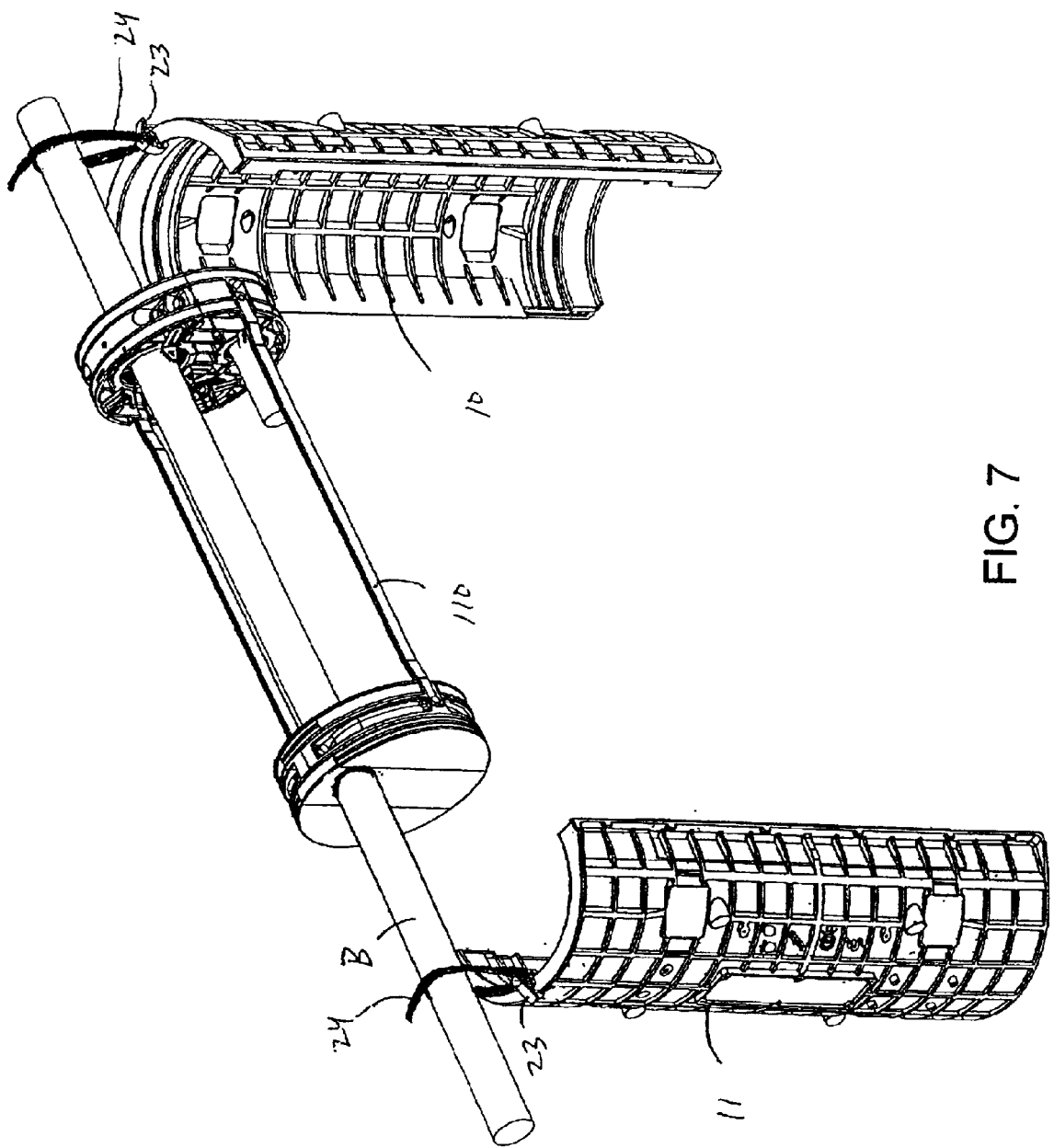
FIG. 7 is a perspective view illustrating use of hanger clips and tie wraps to hang closure shell halves during use.

As shown in FIG. 7, torque bars 110 are used in the closures to maintain rigid support of the end plates once the closure shells have been removed. The exterior of the cable closure does not have any holes or features which provide a means for hanging the closure shells near the work area once they are removed from a splice point of cable within the closure. During work on a cable closure in an aerial application, access is required to the interior of the closure in between the end plates 120.

Figure 10:
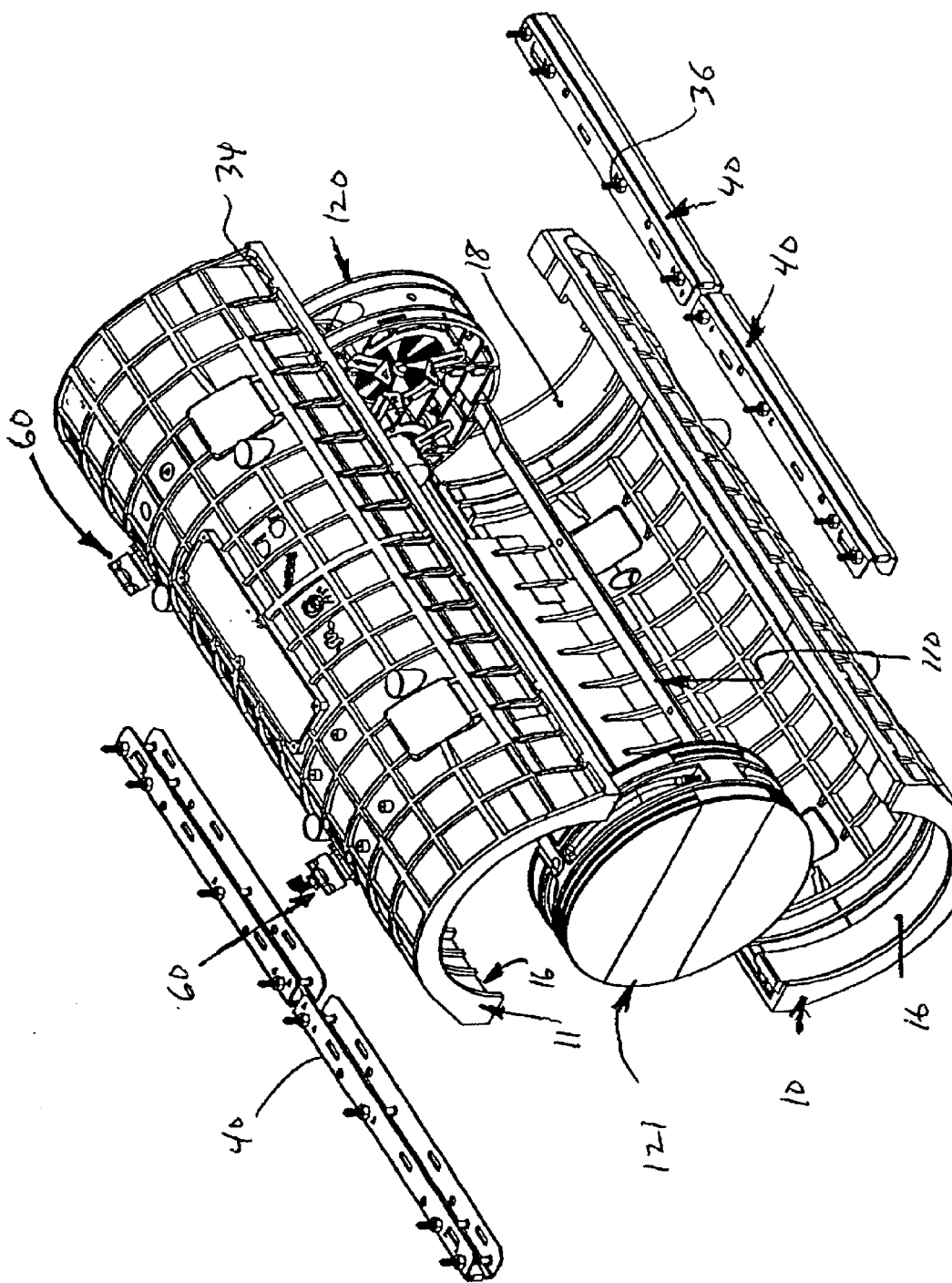
FIG. 10 is an exploded perspective view of the closure illustrating bolt and torque bars.
Figure 11:
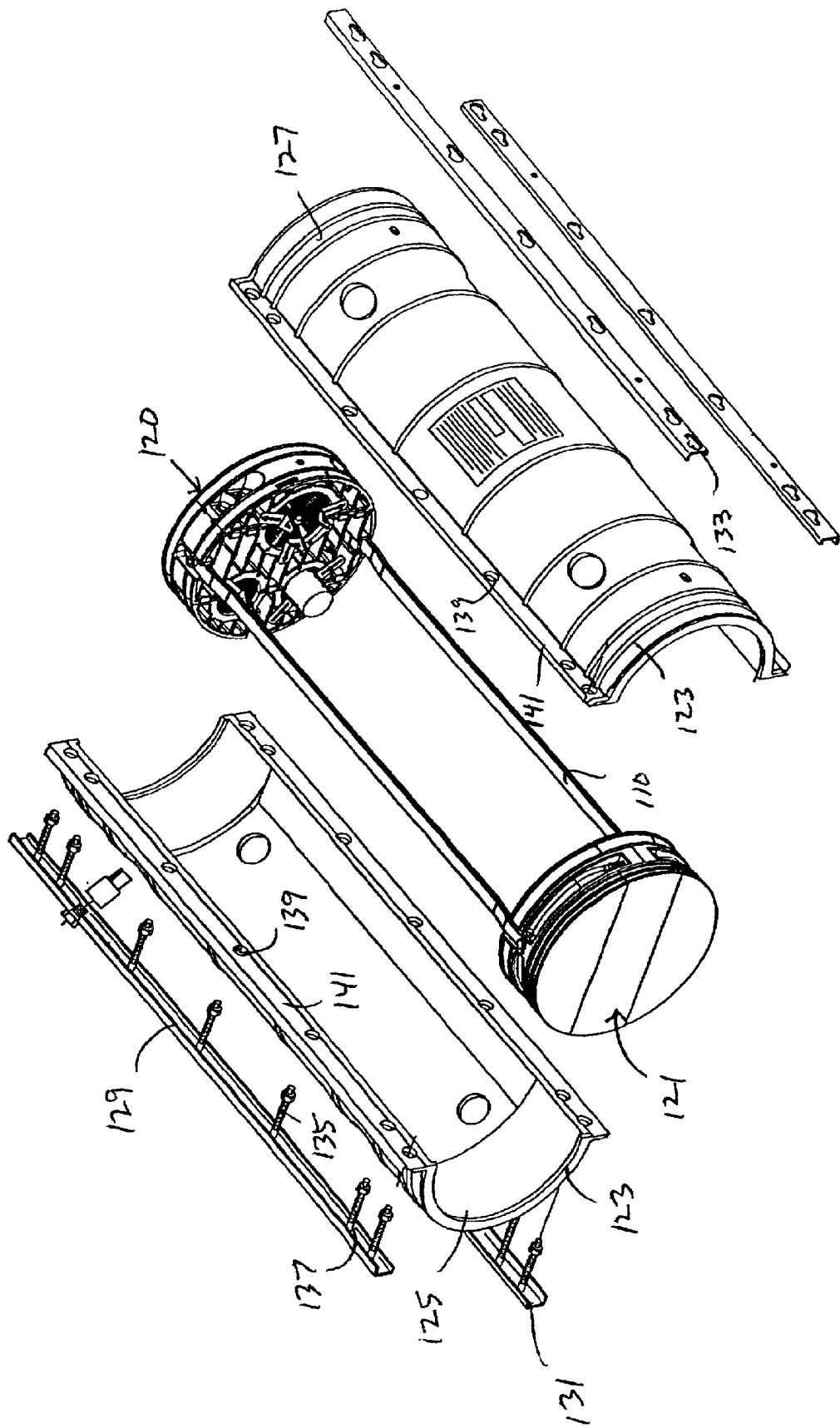
FIG. 11 is an exploded perspective view of a foam-filled end plate and an end plate of the present invention in use with a stainless steel closure.

An end plate system 120 is provided as an alternative to a existing foam-filled end plate system 121 (see FIG. 10). The preferred end plate system 120 is comprised of two major components including end plate sections 122 and a sealing washer system 124 (see FIG. 1B). End plate 122 is compatible with existing stainless steel splice case shells 123 (see FIG. 11) as well as the injection molded closure shells. Thus, the foam filled end plate and end plate system of the present invention are interchangeable with the stainless steel closure shells and the gas-injected molded closure shells of the present invention. The stainless steel closure comprises two symmetrical shell sections 125, 127 which are secured together by two sets of lockbars 129, 131. The lockbars have slotted holes 133 which allow for alignment of one of the lockbars with a mating lockbar. One of the mating lockbars has bolts 135 inserted through holes 137 which in turn are inserted through holes 139, 141 in flanges of the shells. The stainless steel enclosures have a diameter which accommodates both of the end plate systems. A problem with the stainless steel closures is that the bolt holes of the lockbars must align with pre-existing holes in the shells; thus, the lockbars do not allow for tolerances in positions of the bolt holes in the lockbars and shells.

With reference to FIGS. 10–12B, the end plate system 120 provides sealed entry and exit points, at each end of the splice enclosure, for cables passing through. With the existing foam-filled end plate 121, each end plate is custom drilled in the field, by the craftsperson, with the use of a portable drilling fixture. This process is time consuming and requires an electrical source to power the drilling fixture. The major benefit of the end plate system 120 lies in the ability to drill custom hole sizes and configurations in the end plate.

The end plate system 120 provides various standard hole sizes and configurations. Each hole defines established maximum allowable cable diameter and a sealing washer system which is used to adapt each hole for the specific size of cable being used.

The closure system includes a wide range of end plate constructions. The end plates provide several advantages including utilization of common components to reduce costs and minimize inventory. All fastening hardware is contained on the interior side of the end plate for protection within the splice closure. This allows for the elimination of the need for stainless steel materials, thus further reducing part cost. Part symmetry is used to reduce the total amount of tools required for producing all of the end plates. Thus, common parts are re-usable in various end plate configurations.

The end plates preferably include at least four sizes: 9.5 inches in diameter, 8 inches in diameter, 6.5 inches in diameter, or 4 inches in diameter. The 9.5-inch end plates are available in at least two configurations: two hole 130 (FIGS. 12A and 12B) and three hole (not shown).

The two-hole assembly 130 is constructed from a two-hole center section 134 and two one-hole end sections 136, 138. The three-hole assembly is constructed from a three-hole center section (not shown), a two-hole end section (not shown) and a one-hole end section.

The 6.5-inch end plate assemblies are available in three configurations: one hole, two hole, and three hole. Symmetry is utilized on the one-hole 6.5-inch end plate to minimize the inventory. This end plate includes two of the same end plate half sections. The two-hole end plate is constructed from a one-hole end section, a two-hole center section, and a one-hole end section. The three-hole end plate is constructed from a two-hole end section, a three-hole end section, and a one-hole end section.

The four-inch end plate has at least one configuration with two holes. The two-hole 4-inch end plate is constructed from two one-hole sections.

The eight-inch end plates are available in at least three configurations: three-hole, two-hole, and one-hole.

With particular reference to FIG. 12A, a nut strip 150 is a stamped, threaded strip of material acts as a large nut. The nut strip provides a large amount of surface area to aid in distributing the loads required to draw the end plate sections together and is used on all of the end plate constructions. The end plates are molded to support one end of the nut strip. The opposing end of the strip is supported by a retainer clip 152. Due to the manner in which the nut strip 150 is retained in the end plate, the threaded hole in the nut strip is not centered over the strip's length. To avoid manufacturing assembly errors, one end of the strip has chamfered corners to indicate proper orientation. If the strip is loaded backwards into the shell 134, the hole in the nut strip will not align with the hole in the end plate section, thus making it physically impossible to assemble the end plate.

The retainer clip 152 supports one end of the nut strip 150. The clip 152 helps to retain the nut strip as the bolt is initially threaded into place. Once the nut strip is pulled upward by the bolt, the clip provides no support.

Referring to FIGS. 13A–13C, gripper brackets 156 are used in conjunction with hose clamps to grip the cable passing through a hole in the end plate. The slots 158 in the bracket allow for adjustment to different cable diameters. The bracket is held in place by a self-tapping screw 160 driven into the face of the end plate. The teeth 162 around the perimeter of the bracket are driven into the jacket of the cable by the force of the hose clamps. One central tooth 164 is provided in the center of the bracket for gripping smaller diameter cables.

If preferred, the gripping bracket 156 can be modified to include an extender bracket 157 to extend the length of the slot 159 in the bracket (see FIGS. 13A, 13B, and 13C). The screws 160 (FIG. 12A) serve as pins on which the gripping bracket can be slid to adjust for different cable diameters. Once the gripping bracket is located to the proper diameter, the screw is tightened to maintain the gripping bracket location. Once the cables are installed into the end plate and the gripper brackets 156 are located, a hose clamp (not shown) is placed around the diameter of the cable on top of the gripper brackets. As the hose clamp is tightened, it forces the teeth on the gripper bracket 156 to embed into the cable sheath. This gripping condition provides strength to retain the cable in the event an axial load would be imposed on the cable.

A torque bar bolt 170 is used for attachment to the torque bar 110. The bolt is passed through a cylindrical hole in the end plate and the square head is contained in a square pocket. The bolt is held in place by an e-clip 172 slipped over the threads. The torque bar 110 is slipped over the bolt 170 and a jam nut is used to fasten the torque bar in place. The square pocket containing the bolt head eliminates rotation during tightening. This approach eliminates the need for insert molding. If the threads of the bolt are damaged, the bolt can be easily replaced without scraping out the entire end plate section.

Mastic bead grooves 180 (FIG. 15) are molded into the end plate to provide channels through which excess mastic sealant compound 220 on the end plate seam can flow as the end plate is being assembled.

Referring to FIGS. 14A and 14B, an air/grounding insert 182 is a member which is preferably molded into place in the end plate. The insert 182 acts as an aperture onto which a standard air valve is selectively connected for inducing air into the splice enclosure. The insert 182 can also be used for attaching electrical grounding devices. The insert 182 is adapted to receive a one-way check valve. The insert 182 is fabricated from metal. O-rings 183, allow for variation in temperature and for bonding surrounding plastic material to the O-ring to the metal. Heat from the plastic forms a membrane wall between the plastic and metal insert, which in turn stops air and water from leaking in or out. The O-ring flexes with temperature and allows the plastic and metal to expand or shrink. A pipe thread 184 within the insert provides the ability to connect a valve for air injection or a plug for grounding purposes.

Alternately, a ground extender 186 (FIG. 12A) is threaded into the air/grounding insert 182 to provide a member on which to connect a grounding braid. Fastening bolts 190 are required for drawing the end plate sections together. Washers 192 are installed below the head of the fastening bolts to provide a more durable surface on which the bolt is rotated. The washers also helps distribute the surface area over which the bolt load is applied. The fastening bolt 190 has a stud area 193 to retain the bolt after it is assembled into the end plate.

As the end plate sections are drawn together, mastic displacement ribs 194 embed into the mastic sealing tape. This causes a displacement of mastic sealing tape 224 (see FIG. 16A) which in turn produces a seal around the circumference of the cable, the face of the washers and the surfaces of the end plate.

Sealing rings 200 (FIG. 12A) are molded on each of the end plate sections which embed into the end plate sealing area on the closure shells, thus forming an air-tight seal between the closure shell and the end plates.

After the cables are installed into the end plate and the gripper brackets 156 are located, a hose clamp (not shown) is placed around the diameter of the cable on top of the gripper brackets. As the hose clamp is tightened, it forces the teeth on the gripper bracket 156 to embed into the cable sheath. This gripping condition provides strength to retain the cable in the event an axial load would be imposed on the cable.

Figure 15:
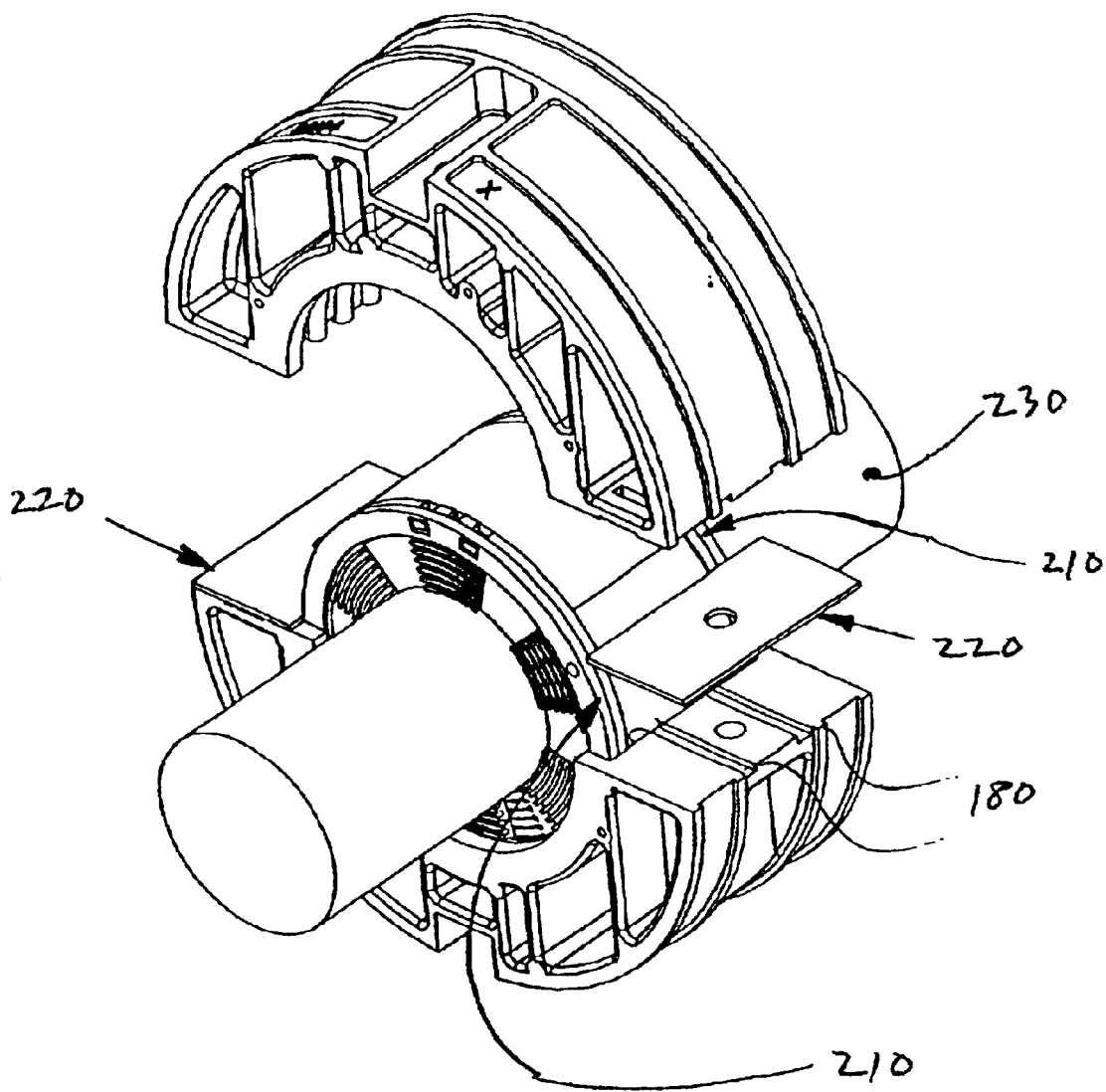
FIG. 15 is an exploded perspective view of an end plate with a cable extending therethrough.

Referring to FIG. 15, sealing washers 210 serve as barriers to contain mastic sealant compound 220 within the opening for the cable 230 of an end plate assembly. The inner diameter of the washer 210 can be cut to compensate for a range of cable diameters. The cutting process can be accomplished with the use of scissors or another cutting device.

Referring to FIGS. 16A–16D, the craftsperson measures the diameter of the cable to be installed into the closure with measuring tape 240. This diameter measuring tape displays letters corresponding to different cable diameters. The sealing washers 210 also display letters corresponding to the measuring tape. The cable is measured to identify the letter to be cut and the craftsperson starts the cutting process.

The craftsperson scuffs the cable 230 to remove any imperfections in the cable jacket which have the potential to create a leak path. A single circumferential wrap of cable prep tape 222 is applied around the outer diameter of the cable (see FIG. 16B). This layer of tape provides a highly tacky surface and promotes a strong bond against the outer diameter of the cable. A second layer of R-sealant or mastic 224 is then wrapped circumferentially, until the outer diameter of the mastic being wrapped is at least equivalent to the outer diameter of the specific washer assembly being used (see FIG. 16A). The R-sealant is a mastic compound formulated to promote re-entry into the closure. Therefore, it is desirable for the R-sealant to be less tacky. This two-ply combination provides the benefits of a more consistent seal against the outer diameter of the cable without sacrificing the ability to easily re-enter the end plate if necessary. Existing closures use either all R-sealant or all B-sealant (same as the cable-prep tape), but not a combination of both.

Prior to assembly of the cable/washer/mastic system into the end plate, the craftsperson uses the check gauge on the measure tape 240 (see FIG. 16C) to ensure the proper amount of compression will occur between the end plate and mastic. The tape is wrapped around the mastic, and if the index line falls within the shaded area indicated on the tape, the amount of compression is acceptable. The check range is previously established by test data which displayed cables that were under-wrapped or over-wrapped had a higher potential for failure (loss of pressure).

Referring to FIG. 16D, the measure tape 240 is wrapped around the R-sealant or mastic tape 224 to measure the amount of compression of the mastic sealant 224 and the end plate. The index line 226 is used to determine if the sealant has been applied to an acceptable size. A check zone for the 2.2-inch diameter washer is illustrated by cross-hatched lines 228. A check zone for the 3.4-inch diameter washer is shown as lines 232. A check zone for the 2.8-inch diameter washer is shown as lines 234. If index line 226 falls outside of zone 234, an adjustment must be made to the amount of sealant to bring it within the zone.

Figure 17B:
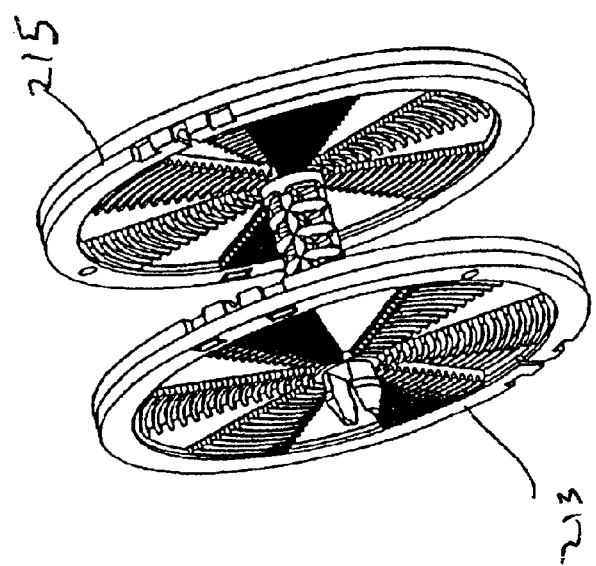
FIG. 17B is a perspective view of two washers attached to a spool.
Figure 17A:
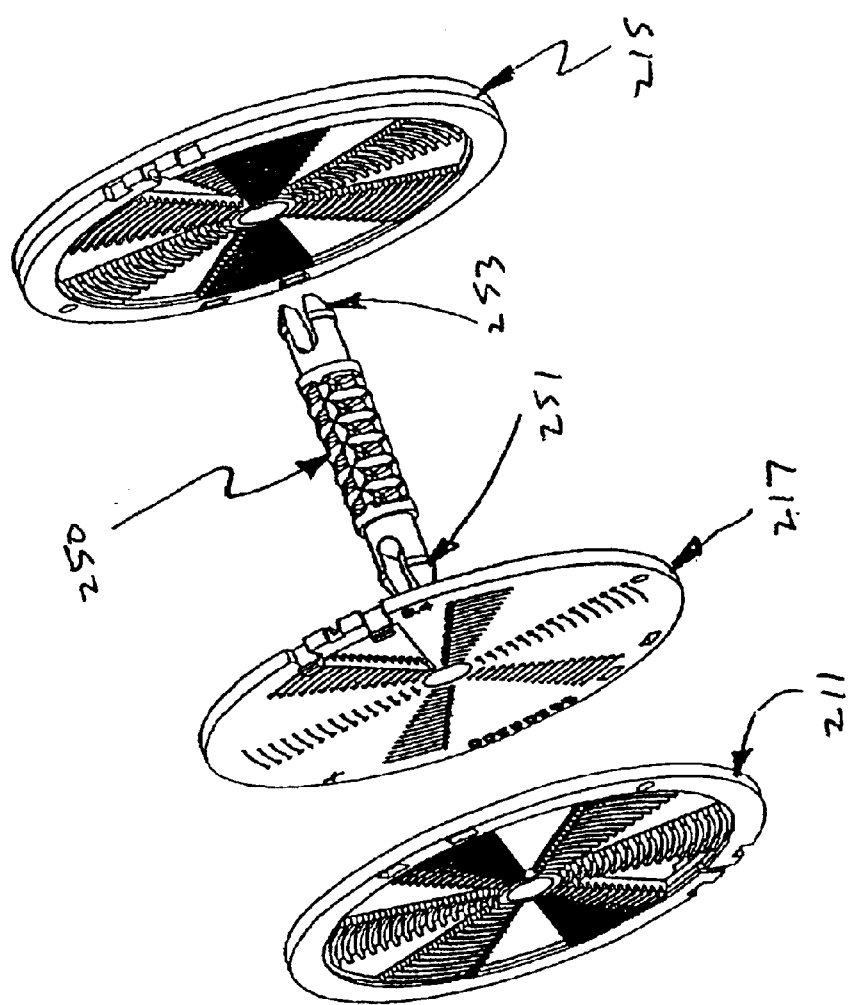
FIG. 17A is a perspective exploded view of two washers and a spool.

Referring to FIGS. 17A and 17B, two washer assemblies 213, 215 can be snapped onto a universal washer spool 250 via snaps 251, 253 for applications where a hole will not be used when the end plate is initially installed. A pair of washer halves 211 and 217 are snapped together to form a single washer assembly. The washers preferably are sized to desired outer diameters, including at least 1.0 inch, 1.6 inch, 2.2 inch, 2.8 inch, and 3.4 inch sizes. The spool 250 provides a surface around which the mastic tape can be wrapped. If the user needs to add a cable at this location, they can disassemble the end plate, remove the spool/washer assembly, remove the spool and re-use the washers to install a new cable. The small diameter of the spool allows it to be used at all hole locations.

Figure 18:
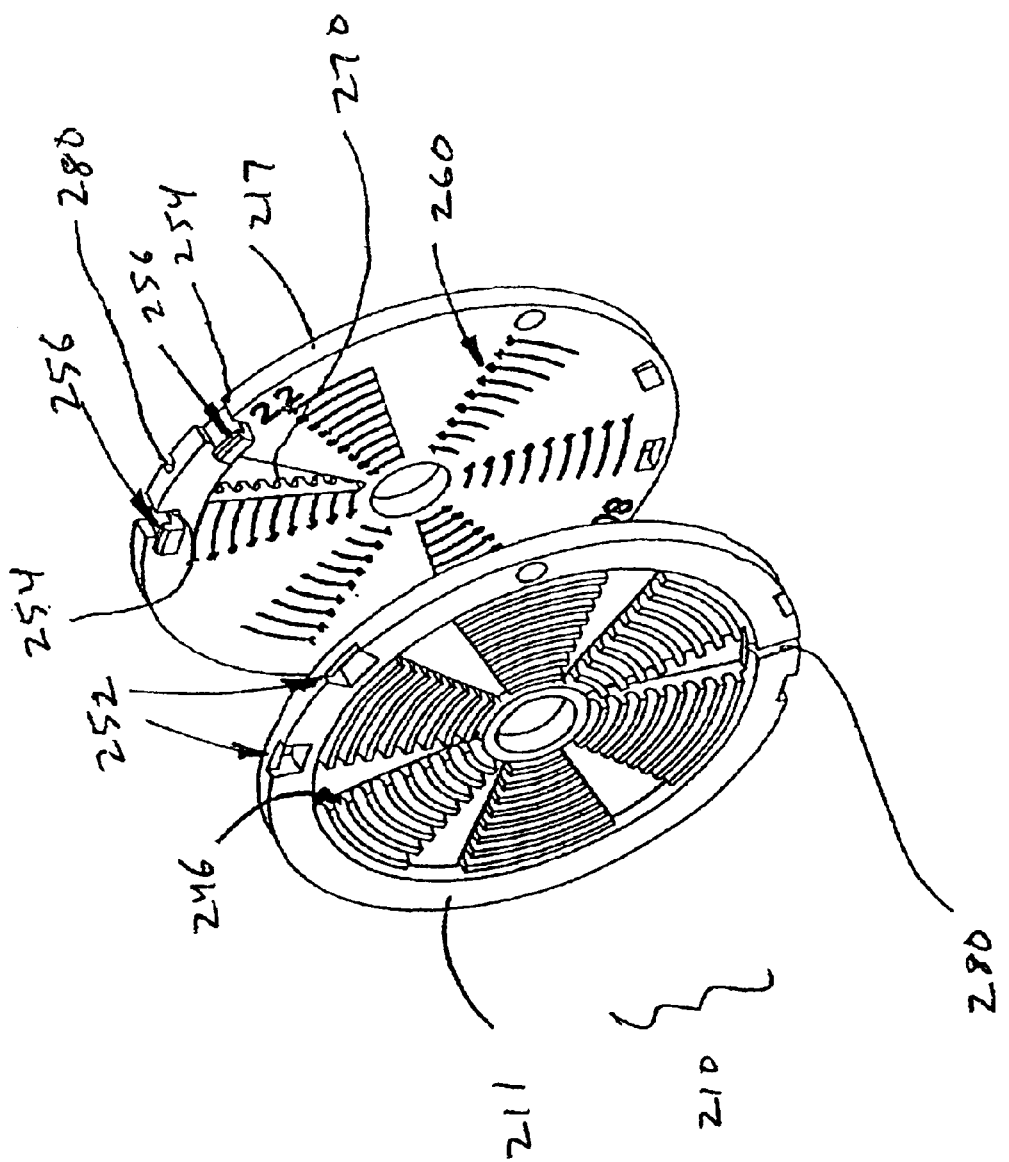
FIG. 18 is a perspective exploded view of two mating washers.

Referring to FIG. 18, the washers are designed symmetrically and can only be assembled in one direction. Upon assembly, an open window 270 of each washer is closed off by the opposing washer, thus creating a solid washer assembly. The formation of a hole is achieved by passing the cutting device to be described below through the open window 270 and cutting along a groove 246 labeled with the letter corresponding to the measuring tape. A second washer 217 is also required to be cut to the same size and the two washers 211, 217 are snapped together to form the desired hole size.

The washers 210 further include the cutting groove 246 to create a guide for scissors or the cutting device. The groove 246 allows for the creation of a thinner section of the washer to be created to ease cutting without sacrificing the strength of the washer.

Receiving holes 252 of washer half 211 receive the snaps 254 from a mating washer half 217. The snaps features cantilever posts 256 which engage and lock into the receiving holes of mating washer 211.

Letter labels 260 correspond to a letter on the measuring tape. The labels 260 provide a reference for the center line of the cutting groove to be cut to form the proper hole size.

The thinner groove section of washer can be cut with scissors if necessary. Thus, no special tools are required. In comparison, existing end plate washers are thick solid disks with concentric annular grooves which require a special tool for cutting. One 360° rotation of a cutting device through a groove produces a properly sized hole through which the cable can pass. The washer must be cut a second time from the outer diameter to the inner diameter to create a split through which the cable can be passed to the inner diameter. This cut (seam) creates a weak point in the washer when it is assembled into the prior art end plate. In the present invention, a cut seam 280 for each washer is protected by the opposing washer thus not allowing a seam which passes directly through the entire washer assembly. This is beneficial over the prior art in that it eliminates a potential leak path and strengthens the washer assembly. Washers can only snap together one way thus minimizing operator error. Symmetrical washer design reduces washer inventory. Furthermore, the washers are re-usable.

The sealing washer end plate system eliminates the need for custom hole size drilling during use of the cable closure. The end plates are provided with predetermined hole size patterns. As previously discussed, the end plate configurations range from having a single hole configuration to a three or more hole configuration. In some field applications not all holes in a multi-hole input design are used. Therefore, washers are used to plug unused hole(s). The washers and spools allow one spool to be used with any size hole. However, additional mastic compound is needed for the universal spool to plug the unused hole.

Figure 19:
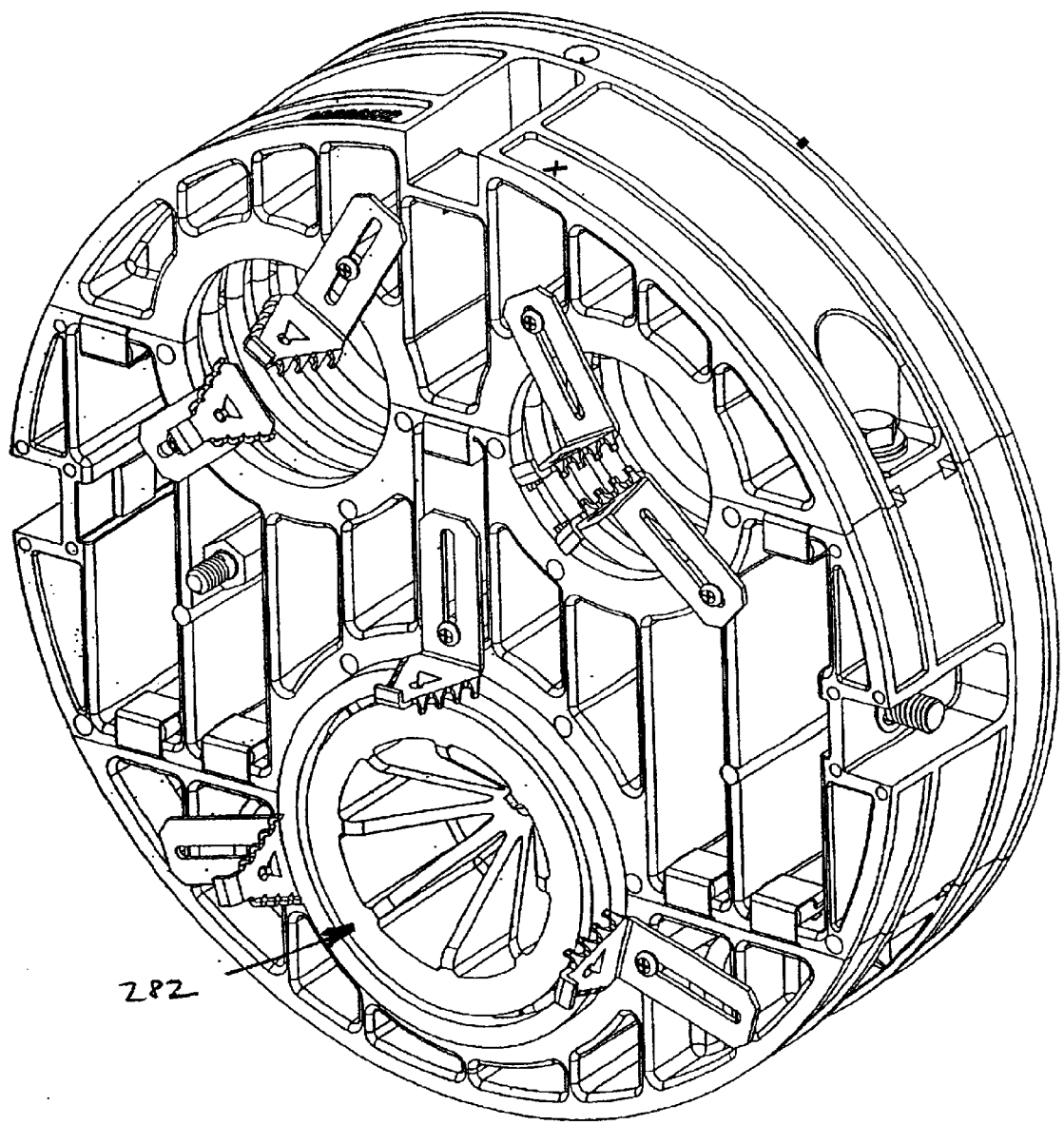
FIG. 19 is a perspective view illustrating a plug wheel installed in a three-hole end plate.

An alternate method for plugging an end plate hole is to use a plug wheel 282 to reduce the amount of mastic or sealing type required to produce a seal on an unused hole. Referring to FIG. 19, the alternate plug wheel is shown installed in one of the unused holes on an end plate. There are a range of at least five different hole sizes used with the end plates. In order to minimize the amount of plugs required to seal the range of hole sizes, the plugs have rings 283 which have outer diameter rings 284 and inner diameter rings 285 separated by a groove 286 therein which are located on opposite sides of a wheel or spool 287. As seen in FIGS. 20C and 20D, the plug wheel is usable with at least two different holes sizes by providing a breakaway outer ring 284 as shown in FIG. 20C adapted to be broken away to decrease the outer diameter of the plug wheel. Thus, the plug wheel can be used for different hole sizes therefore permitting the end user to inventory half the amount of plugs. For smaller hole sizes, the outer diameter ring 284 is broken away from the inner diameter ring 285. For the larger hole sizes, the outer rings are left attached as seen in FIG. 20D. FIG. 19 shows the plug wheel with the outer rings attached installed within the end plate. Mastic seal 288 is wrapped around the inner diameter of the plug wheel as seen in FIG. 20A. As seen in FIG. 20B, the groove 286 is machined into the ring to promote the easy breakaway of the ring when the outer ring is stressed. Less sealing tape or mastic is then required for sealing the plug wheel whenever the smaller diameter plug is used. The spool 250 previously illustrated in FIG. 17A is used on the smallest hole size i.e., the one inch diameter hole. If the sealing washer end plate is required to be re-entered to use a previously plugged hole, the plug wheel can be removed and reused in another end plate.

Figure 21:
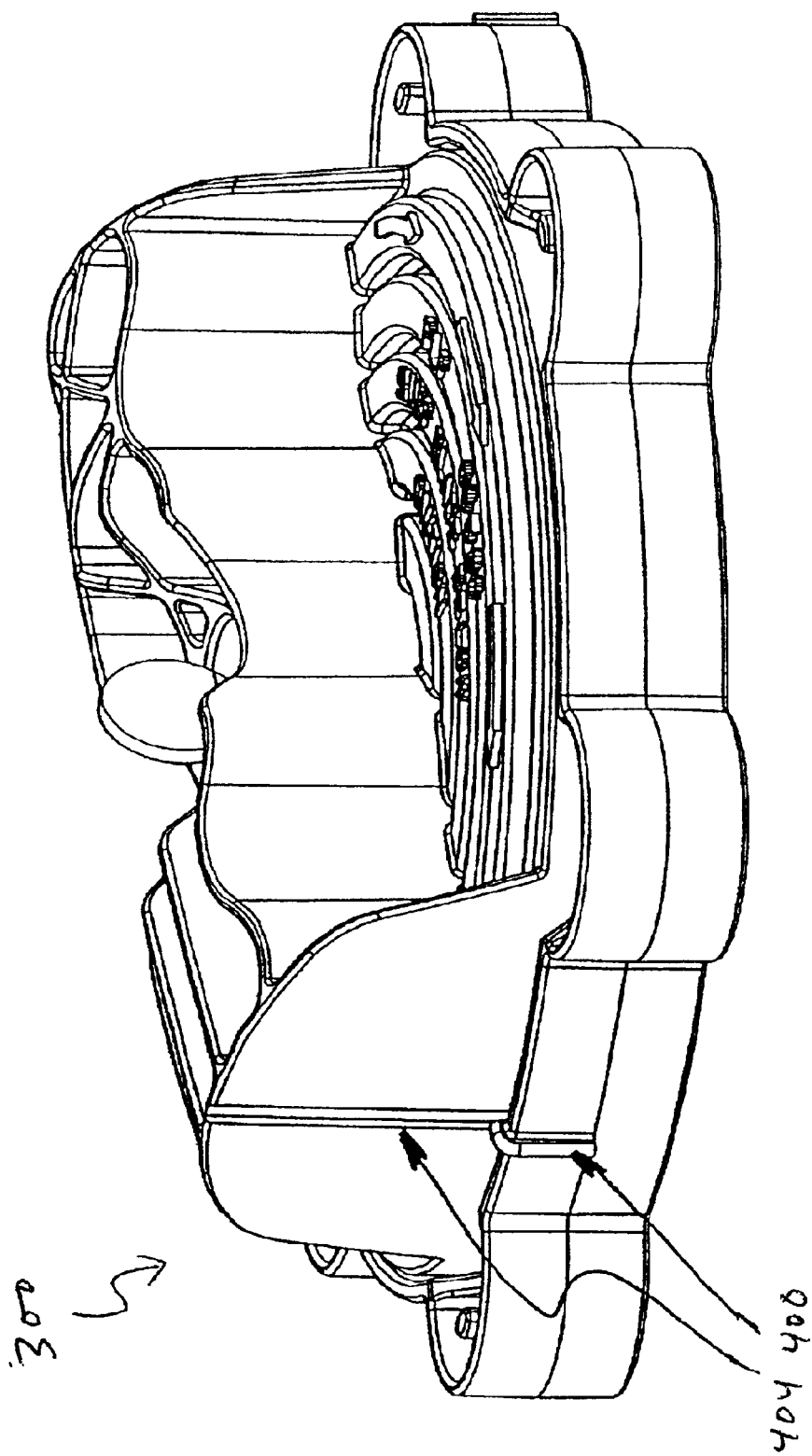
FIG. 21 is a perspective view of an assembled washer cutter.
Figure 22:
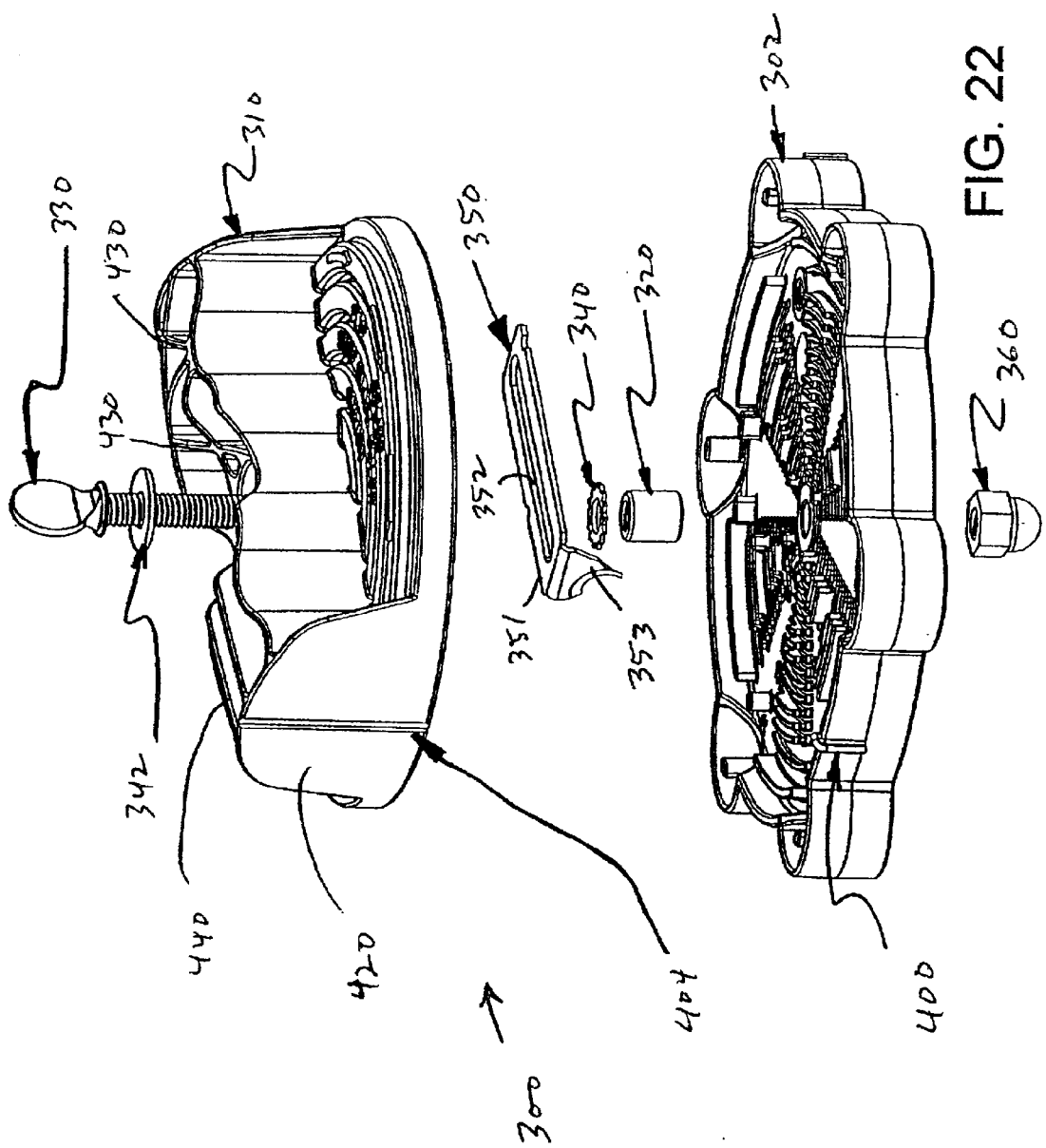
FIG. 22 is an exploded perspective view of washer cutter of FIG. 21.

Referring now to FIGS. 21 and 22, a washer cutter apparatus 300 is used to cut a hole in the center of each washer for allowing various size cables to pass through the washer. The washer cutter assembly comprises an enclosure or base 302, an enclosure or blade housing or cap 310, threaded spacer 320, thumbscrew 330, lock washer 340, flat washer 342, and cutting blade 350. Key features of the assembly include parts are contained within the volume located between the base or second enclosure and cap or first enclosure and protected from loss or damage. The two enclosures are preferably held together, such as with an acorn hex nut 360, during shipment and storage. The base 302 is preferably formed of injection-molded plastic. The primary function of the base is to provide a fixture for retaining any one of five plastic disks used in the closure end plate. Proper retention and rotational restriction of the disk are necessary for properly cutting one of fifteen possible hole diameters and also for safety of the person doing the cutting. Many of the key features relating to the base are for this purpose.

Figure 23:
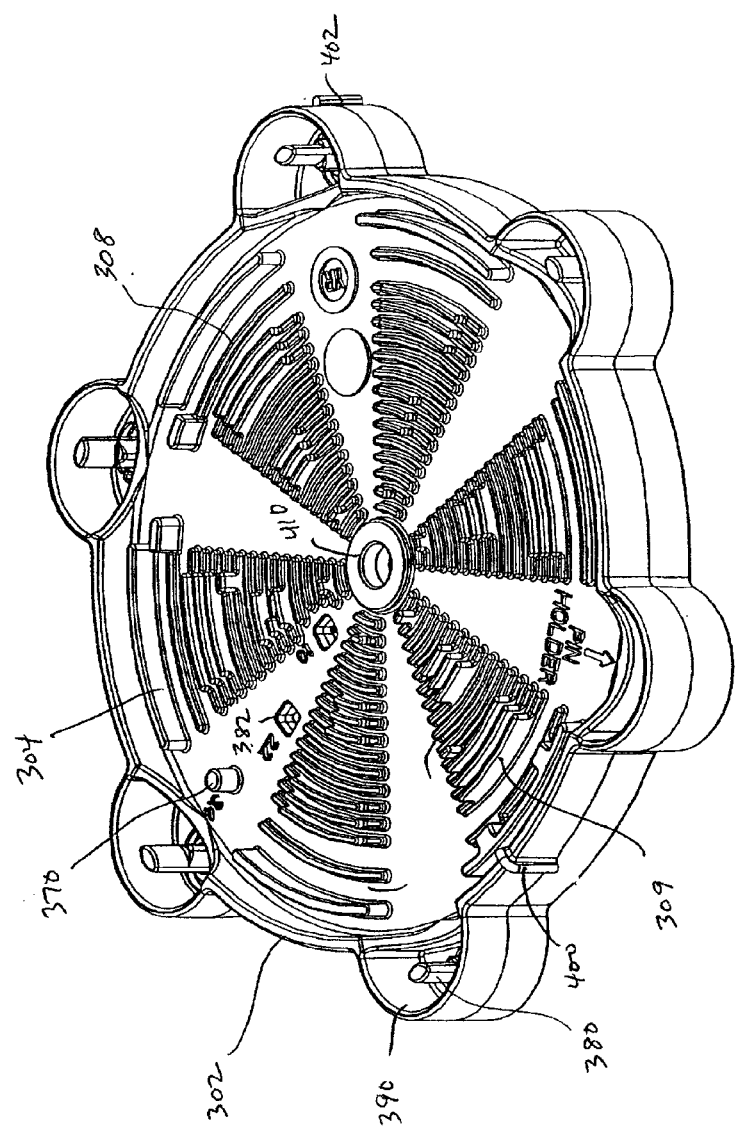
FIG. 23 is a perspective view of a top surface of the base.

The disk is securely held in place in the base and the user's hand is shielded from the path of the cutting blade. The base has two sides. Referring to FIG. 23, the first or top side 304 retains the 3.4, 2.2, and 1.0-inch diameter disks. In contrast, the second or bottom side retains the 2.8 and 1.6-inch diameter disks. This feature allows for enough support for the disk when cutting that would not be available if all five were positioned on the same side.

The base ribs 308 position the disk off of the flat base surface. This allows the cutting blade tip additional clearance below the disk such that it will not scour the base surface.

High ribs 309 nest between the spokes of the disk to help prevent rotation of the disk during cutting. The disks are shaped such that all but one of the open areas between the spokes have been filled in with a thin structural web. For purposes of clearness, only one of the five disks are shown with this web removed (see FIG. 24). Because of this web, the ribs preferably take on two heights: the tallest 309 (which fits through the open area of the disk) and shortest 311 (which fits between the spoke but under the adjoining web). The disks are cut with flush surface in the up position and the grooved cutting channels in the down position.

Referring to FIG. 23, a permanent positioning member or pin 370 has two purposes. The first is to help orient the disk in the proper annular position within the base. The second is to provide additional anti-rotation resistance when cutting. This pin is a permanent feature for the 3.4-inch diameter disk 218 (FIG. 24) which is mounted on the first side 304 and for the 2.8-inch diameter disk which is mounted on the second side of the base.

Permanent pins are not used with smaller disks, e.g. the 2.2-inch disk, 1.6-inch disk, and 1.0-inch, because they would interfere with the blade cutting path of the 3.4 and 2.8-inch diameter disks. The 2.2-inch disk and 1.0 inch disk are installed on the first side of the base. The 1.6-inch disk is installed on the second side of the base. Therefore, five movable pins 380 are molded into the base for use with these three smallest disks. These pins are located in five of six extensions 390 located about the base. Preferably, the extensions are formed as semi-circular ears evenly spaced around the perimeter of the base. The user breaks one of the pins loose and inserts it into the proper square hole 382 depending on the disk to be cut. If one of the two largest disks needs to be cut, then the pin may be removed from hole 382 and placed in a storage hole 384 in the semicircular ear.

The ears 390 provide a grip for the user when the cap holding the blade is turned to cut the disk. As previously discussed, one of the ears is also used to house and protect the movable positioning pin 380 and to provide storage for one pin after use. A side opening 392 of each ear is designed to allow the insertion of a tool or digit to help remove the largest disk. This is not required for the other four disks.

The circular overall shape and construction of the base and the inner ring sections provide a path 394 for the cap to travel in.

Figure 24:
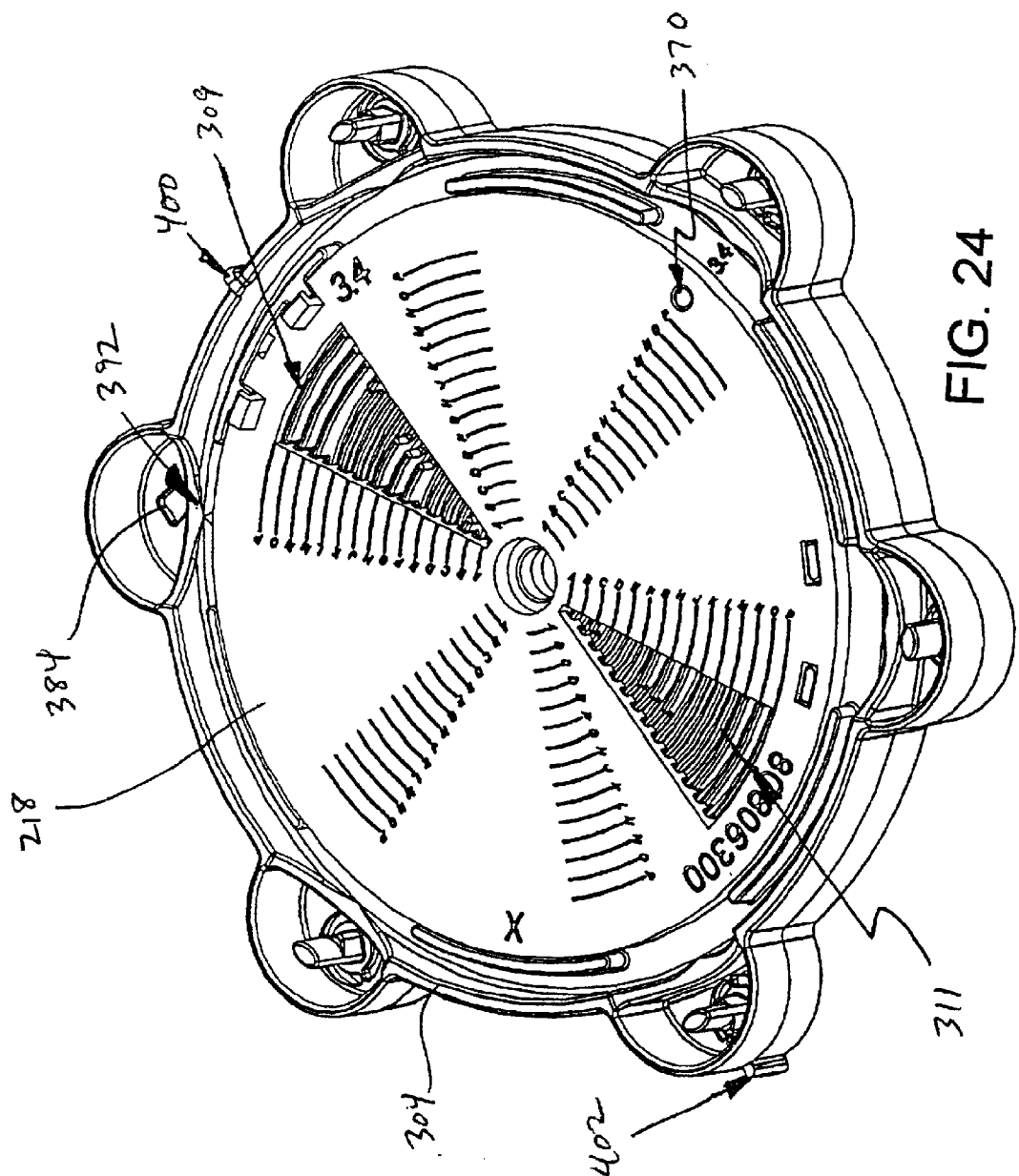
FIG. 24 is a perspective view of a 3.4-inch disk mounted on the top surface of the base.

A pair of alignment ribs 400, 402 are provided on each side of the base of the alignment ribs to properly position the blade in the cap relative to the base. Referring to FIG. 24, a groove 404 on the cap is positioned in an aligned relationship with the rib(s) 400, 402 on either side for this alignment. The alignment ensures that the cutting blade properly passes through the open window in the washer prior to cutting and, thus, eliminates damaging the cutting blade.

Surface 410 at the center of the base provides a reliable bearing surface on which the threaded spacer 320 will ride.

The blade housing 310 is also preferably made of injection-molded plastic and is used to position and retain the cutting blade. Referring to FIG. 22, handle 420 is ergonomically designed to approximate the curvature and fit of the average user's hand. Crisscross ribs 430 provide strength as well as additional surface are to alleviate the stress felt by the hand of the user. Straight ribs 440 provide strength in the blade area and additional support for the hand of the user. The swale in the middle of the handle is designed to allow access to the thumb screw.

Figure 25:
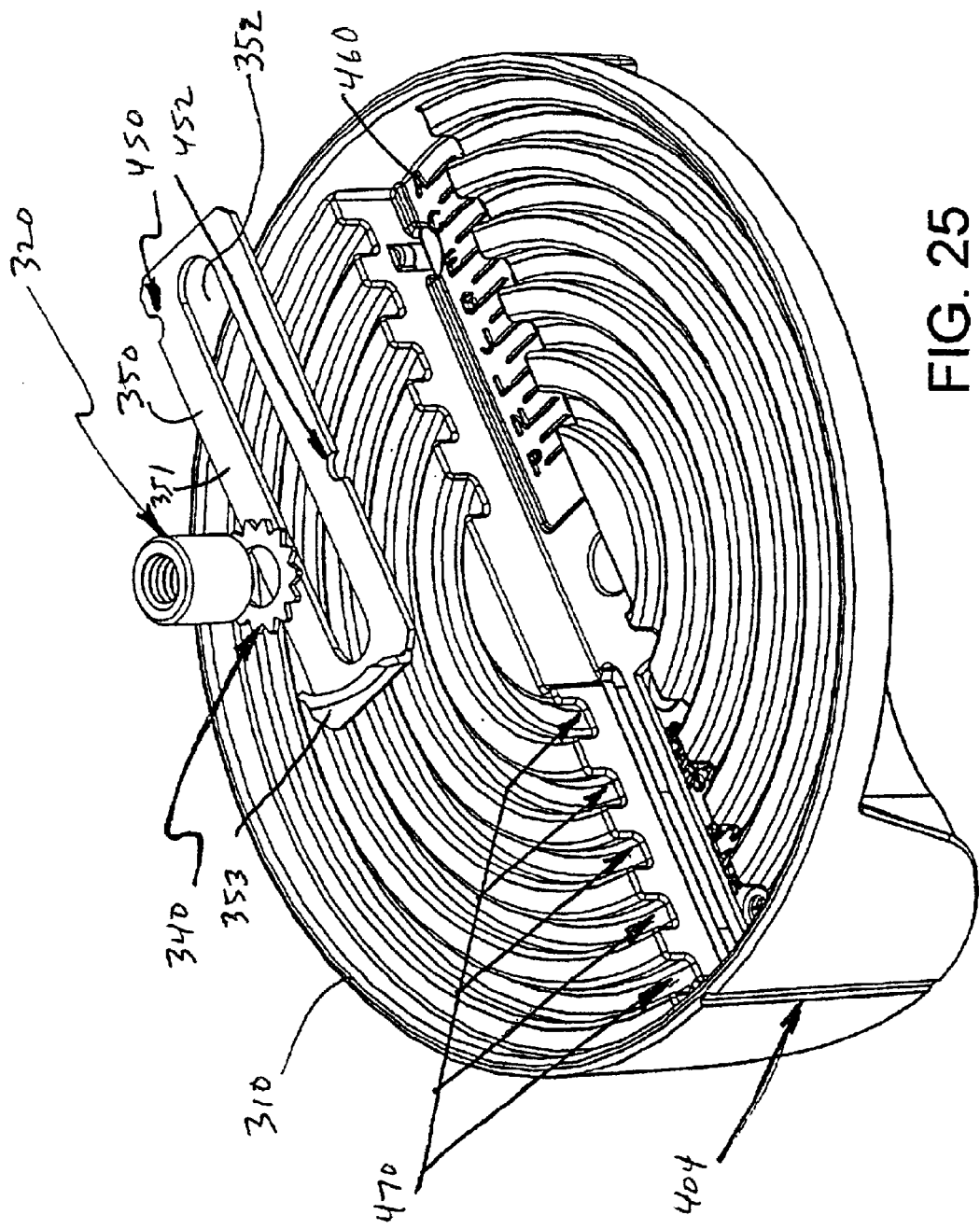
FIG. 25 is an exploded perspective view of the underside of the cutter cap; and, FIG. 26 is a perspective view of the underside of the cap with the blade installed.

Referring to FIG. 25, the handle also houses the blade member 350. The blade 350 can only be inserted in line with two indexing ribs. The blade member 350 includes an elongated member 351 with slot 352 and a bent blade 353 at one end of the blade member. Once inserted, the blade is slid to the other side of the handle where it is held in place by two horizontal ribs. The blade is slid with respect to the thumb screw 330 which extends through slot 352. The blade is placed in an approximate position by aligning the edge of the blade with one of the letters 460 in the cap corresponding to the hole size needed to be cut. The blade is then secured by tightening the thumb screw 330, which compresses the threaded spacer 320 and external-toothed lock washer 340. The blade can be installed in only one direction.

Grooves 470 in the top of the cap 310 stiffen the structure and provide clearance for the snaps 254 of each washer disk.

The alignment groove 404 located on the outside of the cap is used to properly line up the blade with the disk and base. The user lines up this groove with the corresponding alignment rib on either side of the base.

Figure 26:
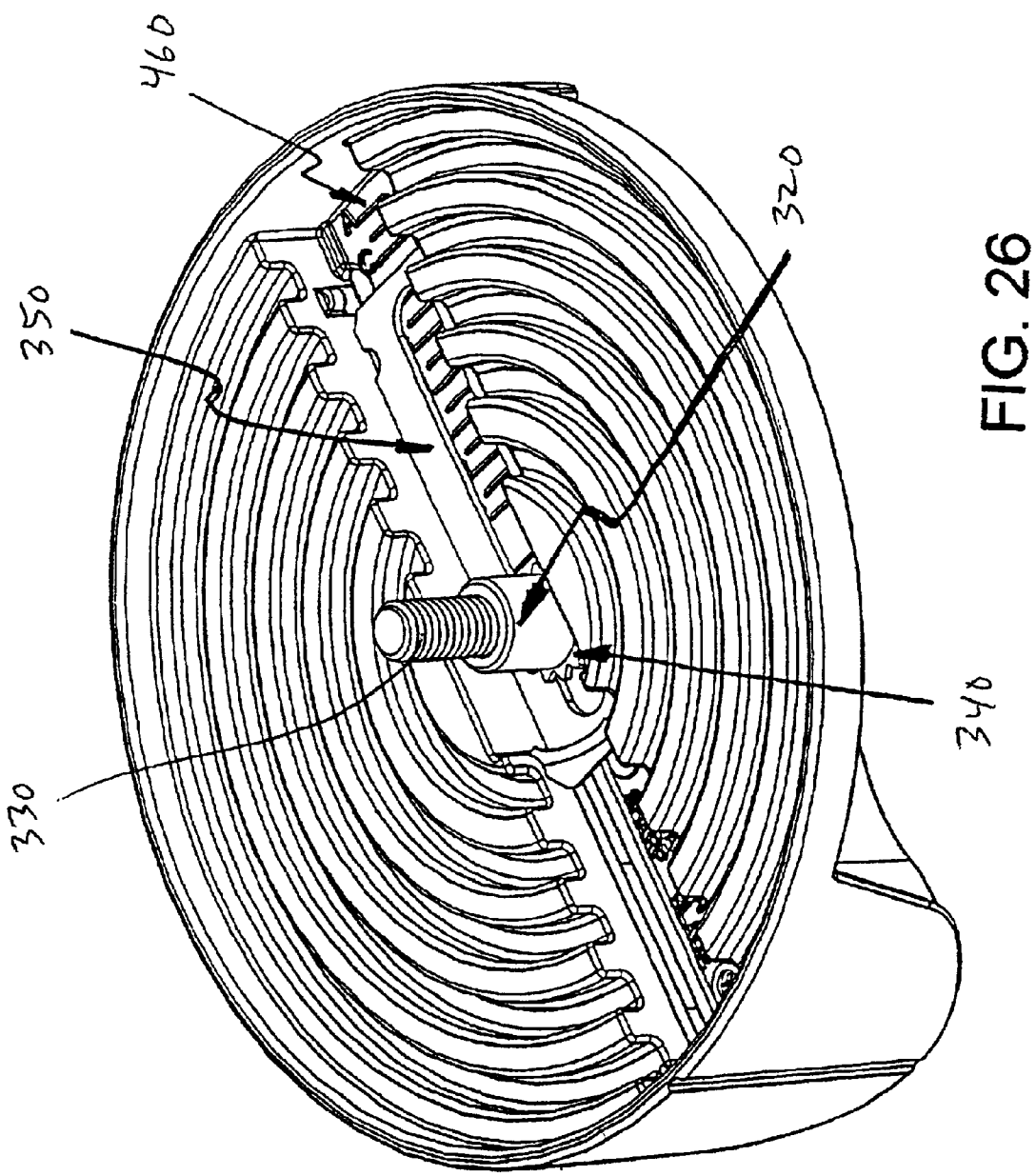

The blade 350 is shaped to work best in conjunction with the corresponding disks. The two notches 450, 452 in the elongated member 351 of the blade are for aligning the ribs in the handle of the cap. Referring to FIG. 26, the blade is positioned to the proper cutting diameter by aligning the end of blade with a corresponding letter 460 and is secured in position by tightening the thumb screw and threaded spacer.

The washer cutter is used in the following manner. First, the thumb screw is loosened. Second, the blade is positioned to proper position using letter indices. The blade is slid along the thumbscrew in the slot 352. The thumb screw is moderately tightened. The desired diameter washer is placed on the threaded spacer in the cap, with washer grooves pointing toward viewer. The thumb screw is loosened and repositioned slightly so the blade is in center of disk groove, if necessary. The thumb screw is then tightened. The washer is then removed. The washer is then placed in the proper base location and is held in place by a positioning pin. The cap is joined with the base lining up the alignment rib(s) and groove. The halves are positioned concentrically. The cap is turned or rotated in a clockwise direction. After completing one turn, the halves are separated and the cut washer is removed. The cut center section of the washer is then discarded.

The invention has been described with reference to the preferred embodiments. Obviously, alterations and modifications will occur to others upon a reading and understanding of this specification. It is intended to include all such modifications and alternations insofar as they come within the scope of the appended claim or the equivalents thereof.

Having thus described the preferred embodiment, the invention is now claimed:

1. A housing assembly for enclosing and storing cable splices comprising:
   first and second end plates axially aligned and spaced apart from one another;
   first and second housing members releasably and sealingly clamped to each other, said housing members enclose said end plates, said end plates being located at opposite ends of said housing members;
   wherein said housing members are symmetrical with respect to each other;
   a sealing member extending along a length of said housing members and located along a longitudinal edge of at least one of said housing members;
   end plate seal members embedded into grooves at opposing ends of seal housing members; and,
   third and fourth housing members interchangable with said first and second housing members, said third and fourth housing members being releasably and sealingly clamped to each other, said third and fourth housing members enclose said end plates and are symmetrical to each other.

2. The housing assembly of claim 1, further comprising a rigid bar member having opposite terminal ends joined to the first and second end plates to hold them in their axially aligned and spaced relationship.

3. The housing assembly of claim 1, wherein each of said first and second housing members includes a plurality of rib elements extending from an exterior surface of said housing member to form a support for permitting said housing member to rest stably on a flat work surface.

4. The housing assembly of claim 1, wherein each of said first and second housing members comprises a main body portion with peripheral clamping flanges extending outwardly therefrom and cooperatively positioned in opposed relationship to another of said housing members to be clamped together, said clamping flanges have inner end portions adjacent said main body portions and having free outer end portions.

5. The housing assembly of claim 4, wherein said sealing member is positioned between said inner end portions of said clamping flanges, and is bonded into said inner end portions along a longitudinal axis of said first and second housing members.

6. The housing assembly of claim 1, wherein said first and second housing members each comprise an injection molded shell.

7. The housing assembly of claim 1, wherein said third and fourth housing members each comprise a stainless steel shell.

8. The housing assembly of claim 1, wherein at least one of said first and second housing members comprises an alignment rib extending along said longitudinal axis of said housing member.

9. The housing assembly of claim 5, further comprising a gasket extending along said longitudinal axis of one of said first and second housing members, said gasket being connected to said end plate seal members.

10. The housing member of claim 9, wherein said gasket is recessed within a groove along said longitudinal axis of said first housing member, said gasket being located on a first side of said first housing member, said sealing member being located along a second side of said first housing member.

11. The housing member of claim 10, wherein said second housing member carries said seal member located on a first side of said second housing member and a gasket recessed within a groove along a second, opposite side of said second housing member, wherein said gasket of said first housing member and said seal member on said second housing member are compressed together to form a seal, and wherein said seal member of first housing member and said gasket of said second housing member are compressed together to form a seal.

12. The housing assembly of claim 11, wherein said gasket comprises neoprene rubber.

13. The housing assembly of claim 11, further comprising a plurality of tabs protruding from said first and second sides of each housing member along said longitudinal axis.

14. The housing assembly of claim 13, further comprising first and second retention members including a plurality of slotted openings adapted to align with said tabs when the first and second housing members are brought together to an intermated connected position, said retention members clamping said first and second housing members together.

15. The housing assembly of claim 14, wherein each of said retention members includes a pair of members each having a plurality of slotted openings and a plurality of fastening means to secure said pair of slotted members to each other.

16. The housing assembly of claim 15, wherein said slotted members are generally parallel to each other.

17. The housing assembly of claim 16, further comprising a spacer which is compressed between said pair of slotted members to transfer a uniform load along said longitudinal axes of said housing members.

18. The housing assembly of claim 16, wherein said retaining members are outboard of said clamping flanges of said housing members.

19. The housing assembly of claim 1, further comprising a filling flange attached to an outside surface of one of said housing members.

20. The housing assembly of claim 19, wherein said filling flange is spin welded to said housing member.

21. The housing assembly of claim 19, wherein said filling flange includes a cap and an air valve sealed by said cap.

22. The housing assembly of claim 19, wherein said filling flange includes a cap and a check valve for injecting encapsulant to said housing, said valve being sealed by said cap.

23. The housing assembly of claim 19, wherein said filling flange includes a cap and a grounding plug secured within said cap for accommodating a grounding wire.

24. The housing assembly of claim 1, wherein said end plates each include fastening means located within said end plates.

25. The housing assembly of claim 24, wherein said end plates define at least one hole for cable insertion.

26. The housing assembly of claim 24, wherein said end plate fastening means comprises a nut strip which distributes loads required to draw end plate sections together to fasten said end plate sections to each other.

27. The housing assembly of claim 1, further comprising an air and grounding insert molded into an opening within each of said end plates for connecting an associated air valve and grounding insert to said housing.

28. The housing assembly of claim 1, wherein said end plates each include at least one gripping member comprising teeth for gripping cable and a slotted elongated member which extends to accommodate cables of varying widths.

29. The housing assembly of claim 24, wherein said end plates comprise varying outer diameters to accommodate housing members of varying sizes.

30. An end seal washer assembly for use with a cable closure, comprising:
a first washer including a disk having a first side and a second side, said first side having a plurality of ribs extending radially outward from the center portion of said washer, said second side having a flat surface; and,
a second washer including a disk having a first side and a second side, said first side having a flat surface, said second side having a plurality of ribs extending radially outward from the center portion of said second washer, said first washer and second washer being symmetrical with respect with each other.

31. The end washer of claim 30, wherein:
said first washer further includes holes spaced apart along a peripheral edge of said first washer; and,
said second washer includes tabs spaced apart along a peripheral edge of said second washer, said tabs engaging said holes to secure said first washer to said second washer.

32. The washer of claim 30, wherein said second side of said first washer and said first side of said second washer each include a plurality of sections with grooves and reference labels adjacent said grooves for determining which grooves will be cut.

33. The washer of claim 30, wherein said grooves of one of said washers are adapted to matingly engage solid wall sections of the other of said washers.

34. The washer of claim 30, wherein said first washer and said second washer are formed of thermoplastic.

35. The washer assembly of claim 30, further comprising a third washer including a disk having a first side and a second side, said first side having a plurality of ribs extending radially outward from the center portion of said washer, said second side having a flat surface.

36. The washer assembly of claim 35, further including a fourth washer comprising a disk having a first side and a second side, said first side having a flat surface, said second side having a plurality of ribs extending radially outward from a center portion of said second washer, said third washer and said fourth washer being symmetrical with respect to each other.

37. The washer assembly of claim 36, further comprising a spool which extends through center openings of said washer and connects said first and second washers to said third and fourth washers.

38. The washer assembly of claim 37, wherein said first and second washer and said third and fourth washer are adapted for assembly in a single orientation.

39. The washer assembly of claim 32, wherein said grooves provide a path for cutting an opening through each of said washers.

40. The method of measuring an outer diameter of cable prior to insertion through a seal washer, comprising:
inserting said cable through a pair of seal washers;
applying a layer of tape around an outer diameter of said cable;
applying a layer of sealant on the said cable and said tape until an outer diameter of said sealant is at least equivalent to an outer diameter of seal washers;
wrapping a measuring tape around said sealant; and,
using index lines of said tape to measure the amount of sealant applied to said cable.

41. A portable washer cutter for cutting an internal cut out from a flat washer, the washer cutter comprising:
first and second enclosures adapted to cooperatively engage together to cut a circular internal cut-out from an associated flat washer;
said first enclosure comprises an internal cavity with a cutting member secured thereto;
said second enclosure comprises a supporting structure for said washer;
said first and second enclosures being connected via an axle extending through an opening of said first and second enclosure;
said cutting member being radially adjustable between a first position adjacent an outer perimeter of said first enclosure to a second position adjacent a center axis of said first enclosure;
said first enclosure having a plurality of radial grooves extending from said central axis of said enclosure to said perimeter of said enclosure; and,
said second enclosure having a plurality of ribs extending radially outward from said center axis of said second enclosure, said ribs being located on a first side and a second side of said second enclosure.

42. The washer cutter of claim 41, wherein said ribs vary in height from a first height to a second height, wherein said second height is greater than said first height, wherein ribs of said first height space said associated washer from a surface of said second enclosure and ribs of a second height engage spokes of said washer to prevent rotation of said washer when mounted on said second enclosure.

43. The washer cutter of claim 41, wherein said first and second enclosures are made from injection molded plastic.

44. The washer cutter of claim 41, wherein said ribs of greater height extend through an open portion of said washer to prevent rotation.

45. The washer cutter of claim 43, wherein said ribs of greater height are spaced apart in a radial direction to accommodate washers of varying diameters.

46. The washer cutter of claim 45, wherein said first side of said second enclosure accommodates washers of three different outer diameters, and said second side of said second enclosures accommodates washers of two different outer diameters.

47. The washer cutter of claim 41, wherein said second enclosure further comprises a plurality of extensions extending from a peripheral edge of said enclosure, each of said extensions comprises a detachably secured positioning member.

48. The washer cutter of claim 47, wherein said extensions serve as hand grips during use of said cutter.

49. The washer cutter of claim 48, further comprising a positioning member secured to said first side of said second enclosure and positioning member secured to said second side of said enclosure.

50. The washer cutter of claim 49, wherein said second enclosure comprises a plurality of holes for accommodating said detachable positioning members.

51. The washer cutter of claim 49, wherein one of said positioning members is detached from one of said extensions is positioned within one of said openings in said second enclosure.

52. The washer cutter of claim 51, wherein said positioning members engage slots within said washers.

53. The washer cutter of claim 50, wherein one of said extensions comprises a hole to store a positioning member after being detached from one of said extensions.

54. The washer cutter of claim 53, wherein said extensions are semi-circular.

55. The washer cutter of claim 41, wherein said second enclosure further comprises an alignment rib on a first surface and a second surface of said enclosure.

56. The washer cutter of claim 55, further comprising an alignment groove on said first enclosure, said groove lines up with said alignment ribs of said second enclosure for proper positioning of said cutting member.

57. The washer cutter of claim 41, wherein said first enclosure further comprises a handle ergonomically shaped to approximate the shape of a user's hand.

58. The washer cutter of claim 57, wherein said cutting member comprises an elongated member having a slot therethrough and a blade positioned at one end of said elongated member.

59. The washer cutter of claim 58, wherein said cutting member further comprises a threaded member extending through a hole in said first enclosure and through said slot of said elongated member.

60. The washer cutter of claim 59, wherein said blade is moved to a location indexed by an index marking on said first enclosure and is secured into place by tightening said threaded member.

61. The washer cutter of claim 60, wherein said elongated member further comprises grooves which align with ribs in said second enclosure.

62. The washer cutter of claim 61, wherein said grooves of said first enclosure provide clearance for tabs on said washers.

63. The washer cutter of claim 56, wherein said first enclosure is aligned with said second enclosure by aligning said alignment rib in said groove, wherein said first enclosure is placed onto said second enclosure and is rotated 360° to cut said washer.

64. A plug for sealing an end plate opening, comprising:
    a first ring;
    a second ring spaced apart from said first ring;
    a spool connecting said first ring to said second ring, wherein each of said first and second rings comprise a groove extending around a perimeter of said rings, said groove divides each of said rings into an outer diameter ring and an inner diameter ring, wherein said outer diameter rings are removable from said inner diameter rings.

65. The plug of claim 64, wherein each of said outer diameter rings has a greater diameter than said inner diameter rings.

66. The plug of claim 64, wherein said outer diameter ring is separated from said inner diameter ring by applying a force to said outer diameter ring.

67. The plug of claim 64, wherein sealant is applied to an outer diameter of said spool until said outer diameter of said spool approximates the outer diameter of said first and second rings.

68. A hanging clip for suspending cable closure shells during use, comprising:
    a body portion;
    a first member extending from said body portion;
    a second member extending from said body portion, wherein said first member and said second member are spaced apart;
    a third member extending from said body portion for providing a grip for a user's hand; and,
    at least one slot for receiving a tie wrap, said slot located within said body portion.

69. The hanging clip of claim 68, wherein said first member comprises a snap finger which engages an exterior rib of an associated closure shell.

70. The hanging clip of claim 68, wherein said second member comprises a locator rib which contacts an interior surface of an associated closure shell.

71. The hanging clip of claim 68, wherein said first and second members are generally parallel to each other.

72. The hanging clip of claim 68, wherein said third member comprises a finger grip which is adjacent to said first member.

73. The hanging clip of claim 68, further comprising a second slot generally perpendicular to and intersecting said first slot.

74. The hanging clip of claim 68, wherein said clip is installed on said closure shell by applying a force to said hanging clip via said third member, separating said first and second members from each other to engage a rib on said associated closure shell.

75. The plug of claim 64, wherein a tie wrap is inserted through said slot and is tied to an associated cable to suspend said closure shell from said cable.

* * * * *